(12) United States Patent
Passler et al.

(10) Patent No.: US 11,709,249 B2
(45) Date of Patent: *Jul. 25, 2023

(54) GEO-LOCATING OF WIRELESS DEVICES USING A BINNING FUNCTION

(71) Applicant: SR Technologies, Inc., Sunrise, FL (US)

(72) Inventors: Mark Passler, Boca Raton, FL (US); Steven Romanow, North Lauderdale, FL (US); Graham Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,032

(22) Filed: Aug. 30, 2022

(65) Prior Publication Data

US 2022/0413124 A1 Dec. 29, 2022

Related U.S. Application Data

(63) Continuation of application No. 17/152,337, filed on Jan. 19, 2021, now Pat. No. 11,460,570.

(60) Provisional application No. 63/057,544, filed on Jul. 28, 2020.

(51) Int. Cl.
*H04W 24/00* (2009.01)
*G01S 13/76* (2006.01)
*H04W 4/029* (2018.01)
*H04W 64/00* (2009.01)

(52) U.S. Cl.
CPC .......... *G01S 13/767* (2013.01); *H04W 4/029* (2018.02); *H04W 64/003* (2013.01)

(58) Field of Classification Search
CPC .... G01S 13/767; H04W 4/029; H04W 64/003
See application file for complete search history.

(56) References Cited

U.S. PATENT DOCUMENTS

| | | | |
|---|---|---|---|
| 11,460,570 B2 * | 10/2022 | Passler | G01S 13/765 |
| 2005/0170843 A1 | 8/2005 | Billhartz et al. | |
| 2016/0337792 A1 | 11/2016 | Bhavsar et al. | |

FOREIGN PATENT DOCUMENTS

CA 2685411 C 11/2008

* cited by examiner

*Primary Examiner* — Erika A Washington
(74) *Attorney, Agent, or Firm* — Christopher & Weisberg, P.A.

(57) ABSTRACT

A method for determining a geo-location of a target station is provided. The method includes receiving a plurality of RTTs over a plurality of successive time intervals. Each successive time interval is equal to a predetermined amount of time. The plurality of RTTs is placed into a plurality of bins. Each bin has a predetermined time width and a count of RTTs placed in the bin. A bin with a highest count of RTTs (maxCb) and another bin with a next highest count of RTTs are selected and a maximum count ratio determined. The bin with maxCb to a maximum bin value is set based at least on a predetermined threshold of the maximum count ratio. During a next successive time interval, the RTTs that are placed in the bin that is set to the maximum bin value are selected to determine the geo-location of the target station.

20 Claims, 17 Drawing Sheets

GEO-LOCATING OF WIRELESS DEVICES USING A BINNING FUNCTION

CROSS-REFERENCE TO RELATED APPLICATION

This application is a continuation of U.S. patent application Ser. No. 17/152,337 filed on Jan. 19, 2021, now U.S. Pat. No. 11,460,570, which is related to and claims priority to U.S. Provisional Patent Application Ser. No. 63/057,544, filed Jul. 28, 2020, entitled "GEO-LOCATING OF WIRELESS DEVICES USING A BINNING FUNCTION," the entirety of both of which are incorporated herein by reference.

TECHNICAL FIELD

The present disclosure relates to geo-location of wireless devices, and in particular to methods, devices, and systems for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and may be referred to as the "Standard" herein.

Location of wireless devices can be determined by various methods. These methods may be classified as active, passive and combined active and passive. In an active location scheme, a device that is determining the location or range, the measuring device, transmits certain packets, referred to as "ranging packets", to a device being located, i.e., the target device. A common method is to measure the time of arrival (TOA) of a response packet from the target device. and compare that to the time of departure (TOD) of the ranging packet that was transmitted by the measuring device so as to determine the round trip time, RTT.

In such location systems it is common to use multiple measuring devices to determine the location. In such systems, simultaneous TOA and/or TOD measurements are taken by different measuring devices situated at different points, and the location of the target device is calculated from these simultaneous measurements.

In an active location system, the TOD may be measured for a ranging packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the ranging packet transmitted from the measuring station to the target station is a data packet, the response from the target station will typically be an acknowledgement (ACK) packet. If the ranging packet transmitted from the measuring station to the target station is a control packet, for example a request-to-send (RTS) packet, then the response from the target station will typically be a clear-to-send (CTS) packet. In these two examples, the turnaround time at the target station is defined in the IEEE 802.11 standard as the short interframe spacing (SIFS), which is a preset value. Hence, the time delay, td, or time of flight (TOF) between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three measuring stations 110. The distance of the target station 120 from measuring station 110a is D1, 130. The distance of the target station 120 from measuring station 110b is D2, 140. The distance of the target station 120 from measuring station 110c is D3, 150. The time of flight, TOF1, determined from the calculation TOF=(TOA−TOD−SIFS)/2, is measured for transmissions from measuring station 110a and this can be used to calculate the distance D1 130 using the formula D1=TOF1*c where c is the speed of light. Similarly, TOF2 and TOF3 measurements result in the determination of distances D2 140 and D3 150. The methods for calculating the location of target station 120 using the distances D1 130, D2 140 and D3 150 are well known.

FIG. 2 is a diagram of a location system where a single airborne measuring station 110 is used. The airborne measuring station 110 is depicted being flown in a circular orbit 200, center E 220, around a target station 120 at location F 230. The distance of the target station 120 from the measuring station 110, when the measuring station 110 is at position A 201, is D4 210. The distance of the target station 120 from the measuring station 110, when the measuring station 110 is at position B 202, is D5 211. The distance of the target station 120 from the measuring station 110, when the measuring station 110 is at position C 203, is D6 212. Unless the target station 120 is positioned at the center E 220 of the orbit 200, the distances D4 210, D5 211, and D6 212 will not be equal and thus, in the general sense, as the airborne measuring station 110 moves around the orbit 200 the RTT measurements will vary in relation to the relative positions of the airborne measuring station 110 and the target station 120.

RTT measurements, in the general sense, will exhibit variations due to noise, in the case of weak signal strengths, and, in part, the timing accuracy of the clock at the target station 120 and the timing accuracy of the clock at the airborne measuring station 110.

The signal level, Pr, received at the airborne measuring station 110 is:

$$Pr = Pt + G_1 + G_2 - L_{fs} - Lo \quad (1)$$

Where Pt=Transmit power from the target station 120
$G_1$=Antenna gain at the airborne measuring station
$G_2$=Antenna gain at the target station
$L_{fs}$=Propagation loss, free space
Lo=Obstruction loss With respect of an airborne measuring station 110, the obstruction losses, Lo, for target stations may vary from 0 dB, for line of sight or outdoor target stations, up to 15-20 dB for target stations that are indoors. The range of the airborne measuring station 110 to successfully detect the response packets from each of these target stations is dependent upon the receive sensitivity of the airborne measuring station 110. A standard airborne measuring station, compliant with the Standard, would need to receive a packet without errors and the receive sensitivity is restricted by the noise figure.

Methods to improve the sensitivity of the airborne measuring station 110 include that of a technique known as correlation where the individual bits of the received response packet are compared to the individual bits of the expected response packet and, based upon a correlation threshold, a decision may be taken as to whether the true response packet, CTS or ACK, has been received. As the correlation threshold is lowered, in order to make the sensitivity higher, there is an increased likelihood that pure noise can exceed the threshold and produce a false RTT result.

With reference again to FIG. 2, as the airborne measuring station 110 is moving around the orbit 200, it may be transmitting request packets. Response packets, from the intended target station 120, may be received, and in order to obtain the highest sensitivity, the correlation threshold may be set low, increasing the chance and number of such false RTTs. Furthermore, as the airborne measuring station 110 flies over differing environments, e.g., open, rural, suburban, urban, the background noise levels vary and different correlation thresholds may be required in order to obtain an effective sensitivity that can distinguish the wanted RTT measurements from the false RTTs due to noise. The need to set the correlation threshold to correspond to the environmental background noise may require constant calibration and may result in poorer sensitivity than may have been possible.

SUMMARY

According to one aspect of the invention, a method for determining a geo-location of a target station is provided. The method uses round-trip times (RTTs) of signals transmitted by a measuring station to the target station and response signals received from the target station corresponding to the transmitted signals. The method includes receiving a plurality of RTTs over a plurality of successive time intervals. Each successive time interval is equal to a predetermined amount of time ($T_1$). The plurality of RTTs is placed into a plurality of bins. Each bin has a predetermined time width ($T_W$) and a count of RTTs placed in the bin. A bin with a highest count of RTTs (maxCb) and another bin with a next highest count of RTTs (nextCb) are selected and a maximum count ratio as maxCb/nextCb determined. The method further includes setting the bin with maxCb to a maximum bin value based at least on a predetermined threshold of the maximum count ratio and selecting, during a next successive time interval, the RTTs that are placed in the bin that is set to the maximum bin value to determine the geo-location of the target station.

In some embodiments, placing the plurality of RTTs into the plurality of bins includes determining an average value of the RTTs in each bin of the plurality of bins. The average value corresponds to the bin. For each RTT ($RTT_n$) of the received plurality of RTTs, the $RTT_n$ is placed into the bin that corresponds to the average value if a difference between the $RTT_n$ and the average value is one of less than and equal to half of the $T_W$ of the bin. In some other embodiments, each $RTT_n$ has a receipt time. The receipt time is a time at which the corresponding RTT is received at the measuring station. The method further includes, for each RTT in each bin, determining a time difference between a present time and the receipt time of the RTT, removing, from each bin, each RTT for which the time difference is greater than a preset time interval, and updating the average value of the RTTs in each bin.

In other embodiments, placing the plurality of RTTs into the plurality of bins further includes creating a first bin for a first RTT and including the first bin in the plurality of bins. The first RTT is an RTT that is first received by the measuring station. In addition, the first RTT is placed in the first bin. In some embodiments, if the difference between the $RTT_n$ and the average value is greater than half of $T_W$ of each bin of the plurality of bins, a new bin is created, the new bin is included in the plurality of bins, and the $RTT_n$ added to the new bin. In another embodiment, determining the time difference and removing each RTT is performed after $T_1$ has elapsed.

In some embodiments, selecting the bin with maxCb and another bin with nextCb is performed after $T_1$ has elapsed. In other embodiments, the method further includes determining the geo-location of the target station based at least on the selected RTTs that are placed in the bin that is set to the maximum bin value. In another embodiment, the measuring station is an airborne measuring station.

According to another aspect, a wireless device, WD, is provided. The WD is configured to determine a geo-location of a target station using round-trip times (RTTs) of signals transmitted by a measuring station to the target station and response signals received from the target station corresponding to the transmitted signals. The WD includes processing circuitry that is configured to receive a plurality of RTTs over a plurality of successive time intervals. Each successive time interval es equal to a predetermined amount of time ($T_1$). The processing circuitry is also configured to place the plurality of RTTs into a plurality of bins. Each bin has a predetermined time width, $T_W$, and a count of RTTs placed in the bin. In addition, the processing circuitry is configured select a bin with a highest count of RTTs (maxCb) and another bin with a next highest count of RTTs (nextCb) and determine a maximum count ratio as maxCb/nextCb. Further, the processing circuitry is configured to set the bin with maxCb to a maximum bin value based at least on a predetermined threshold of the maximum count ratio and select, during a next successive time interval, the RTTs that are placed in the bin that is set to the maximum bin value to determine the geo-location of the target station.

In some embodiments, placing the plurality of RTTs into the plurality of bins includes determining an average value of the RTTs in each bin of the plurality of bins, where the average value corresponds to the bin. For each RTT ($RTT_n$) of the received plurality of RTTs, the $RTT_n$ are placed into the bin, B, that corresponds to the average value, if a difference between the $RTT_n$ and the average value is one of less than and equal to half of the $T_W$ of the bin. In some other embodiments, each $RTT_n$ has a receipt time, where the receipt time is a time at which the corresponding RTT is received at the measuring station. The processing circuitry being further configured to, for each RTT in each bin, determine a time difference between a present time and the receipt time of the RTT. In addition, the processing circuitry is configured to, for each RTT in each bin, remove, from each bin, each RTT for which the time difference is greater than a preset time interval and update the average value of the RTTs in each bin.

In another embodiment, placing the plurality of RTTs into the plurality of bins further includes creating a first bin for a first RTT and including the first bin in the plurality of bins, where the first RTT is an RTT that is first received by the measuring station, and placing the first RTT in the first bin. In some other embodiments, the processing circuitry is further configured to, if the difference between the $RTT_n$ and the average value is greater than half of $T_W$ of each bin of the plurality of bins, create a new bin and including the new bin in the plurality of bins and add the $RTT_n$ to the new bin.

In some embodiments, determining the time difference and removing each RTT is performed after $T_1$ has elapsed. In some other embodiments, selecting the bin with maxCb and another bin with nextCb is performed after $T_1$ has elapsed. In another embodiment, the processing circuitry is further configured to determine the geo-location of the target station based at least on the selected RTTs that are placed in the bin that is set to the maximum bin value. In another embodiments, the measuring station is an airborne measuring station.

According to another aspect, an airborne measuring station is provided. The airborne measuring station is configured to determine a geo-location of a target station using round trip times (RTTs) associated with a target station. The airborne measuring station includes a transmitter receiver configured to transmit a signal, where the transmitted signal includes at least a plurality of transmitted packets. The transmitter receiver is further configured to receive a response signal corresponding to the transmitted signal, where the response signal includes at least a plurality of response packets, and measure a plurality of RTTs based on the plurality of transmitted packets of the transmitted signal and the plurality of response packets of the received response signal. The airborne measuring station further includes processing circuitry, where the processing circuitry is in communication with the transmitter receiver. The processing circuitry is configured to receive a plurality of RTTs over a plurality of successive time intervals, where each successive time interval is equal to a predetermined amount of time ($T_1$). The processing circuitry is further configured to place the plurality of RTTs into a plurality of bins. Each bin, B, has a predetermined time width ($T_W$) and a count of RTTs placed in the bin. Placing the plurality of RTTs into a plurality of bins includes determining an average value of the RTTs in each bin of the plurality of bins, the average value corresponding to the bin. For each RTT ($RTT_n$) of the received plurality of RTTs, the $RTT_n$ are placed into the bin that corresponds to the average value if a difference between the $RTT_n$ and the average value is one of less than and equal to half of the $T_W$ of the bin. The processing circuitry is further configured to select a bin with a highest count of RTTs (maxCb) and another bin with a next highest count of RTTs (nextCb) and determine a maximum count ratio as maxCb/nextCb. In addition, the processing circuitry is configured to set the bin with maxCb to a maximum bin value based at least on a predetermined threshold of the maximum count ratio and select, during a next successive time interval, the RTTs that are placed in the bin that is set to the maximum bin value to determine the geo-location of the target station.

In some embodiments, each $RTT_n$ has a receipt time, where the receipt time is a time at which the corresponding RTT is received at the airborne measuring station. The processing circuitry is further configured to, for each RTT in each bin, determine a time difference between a present time and the receipt time of the RTT, remove, from each bin, each RTT for which the time difference is greater than a preset time interval, and update the average value of the RTTs in each bin.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

Figure 15:
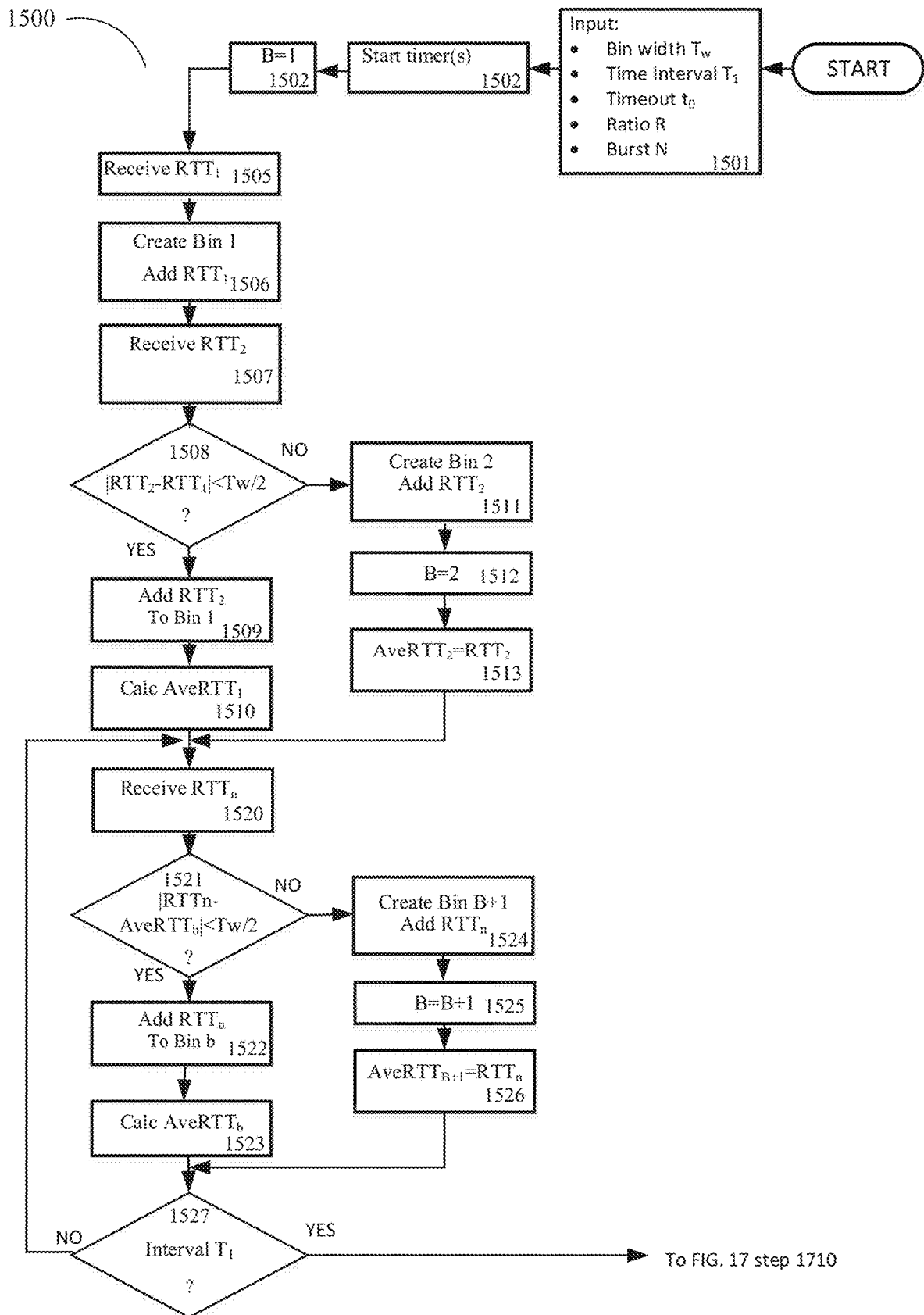
Figure 16:
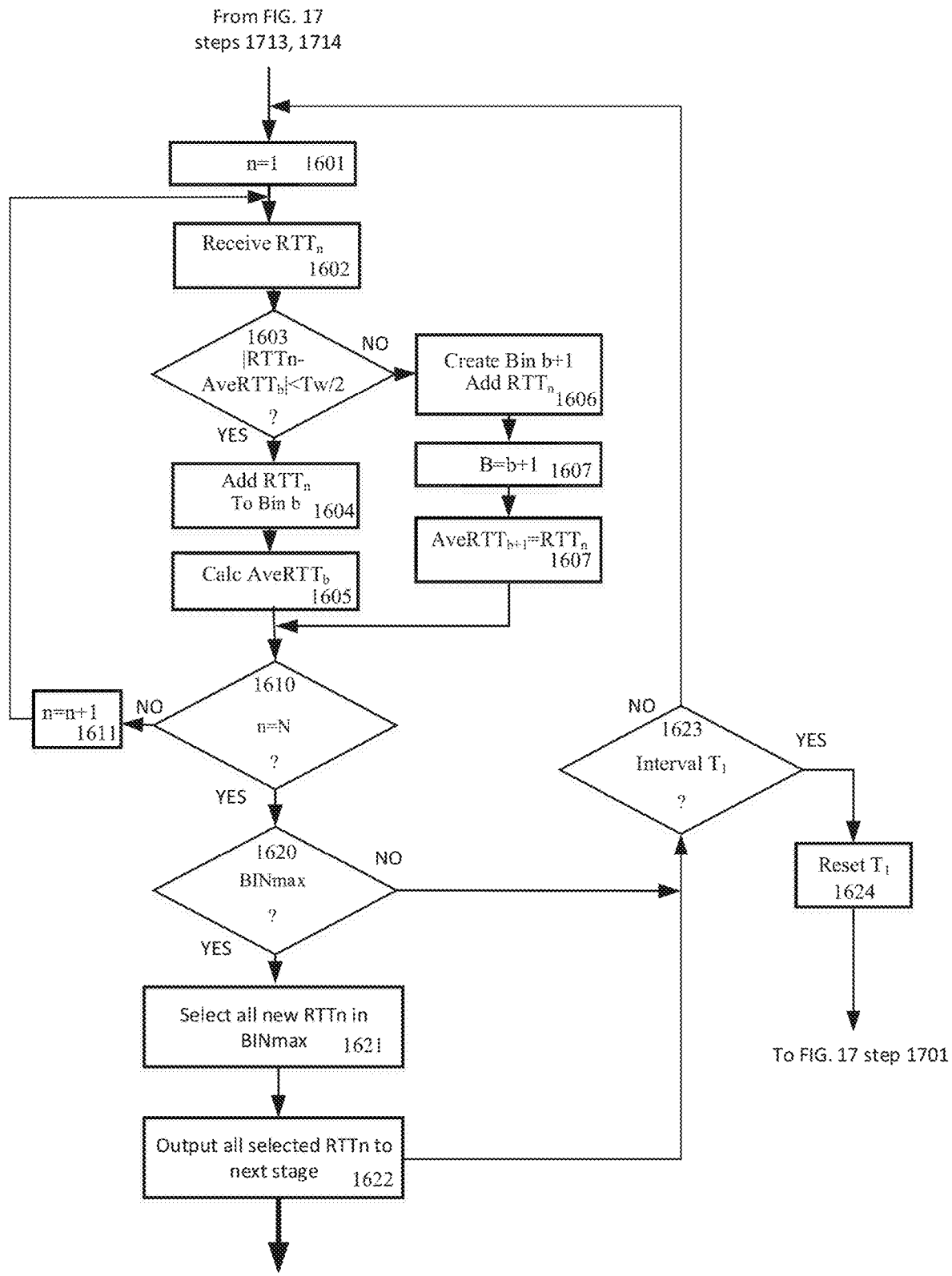
Figure 17:
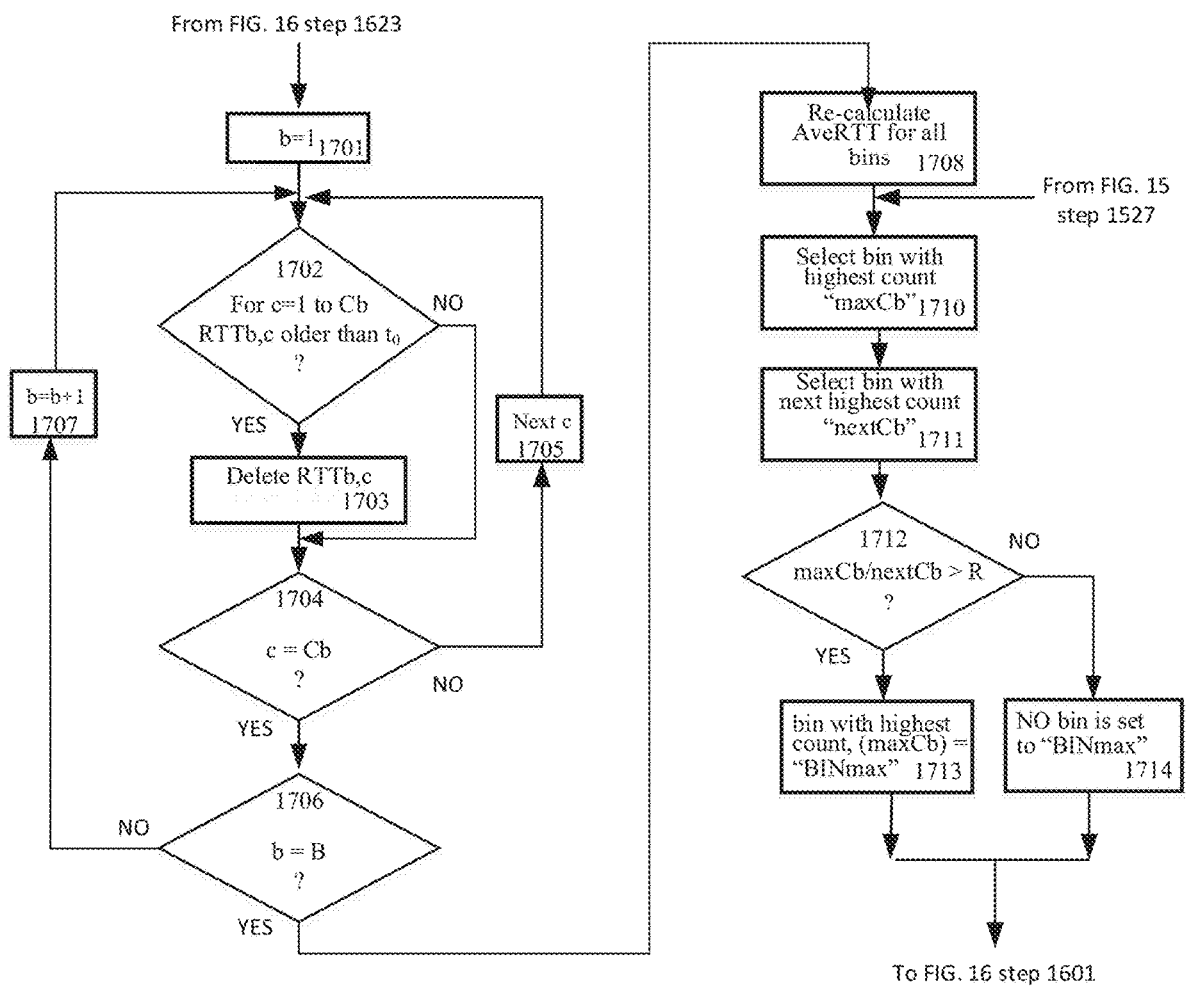
Figure 18:
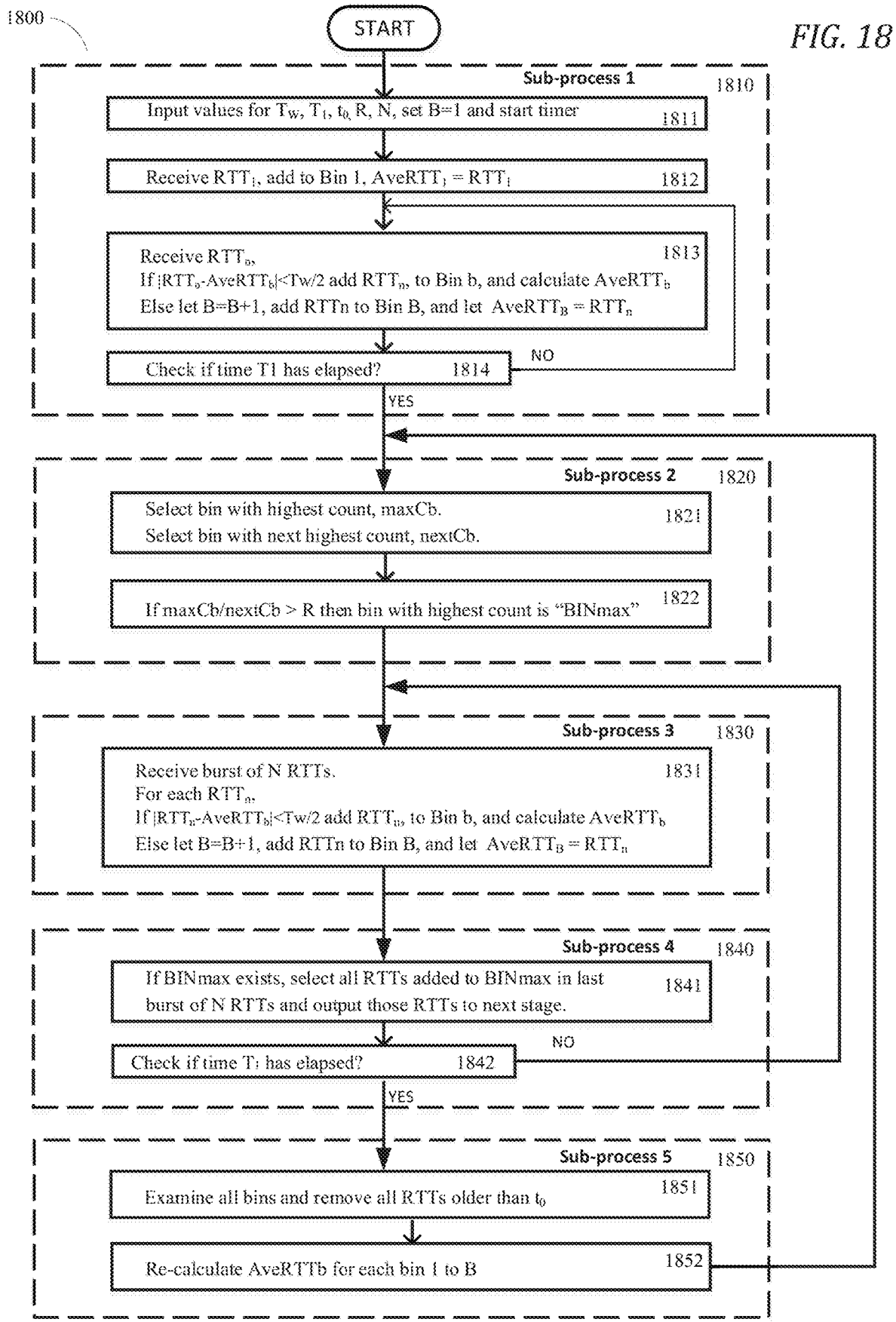
Figure 19:
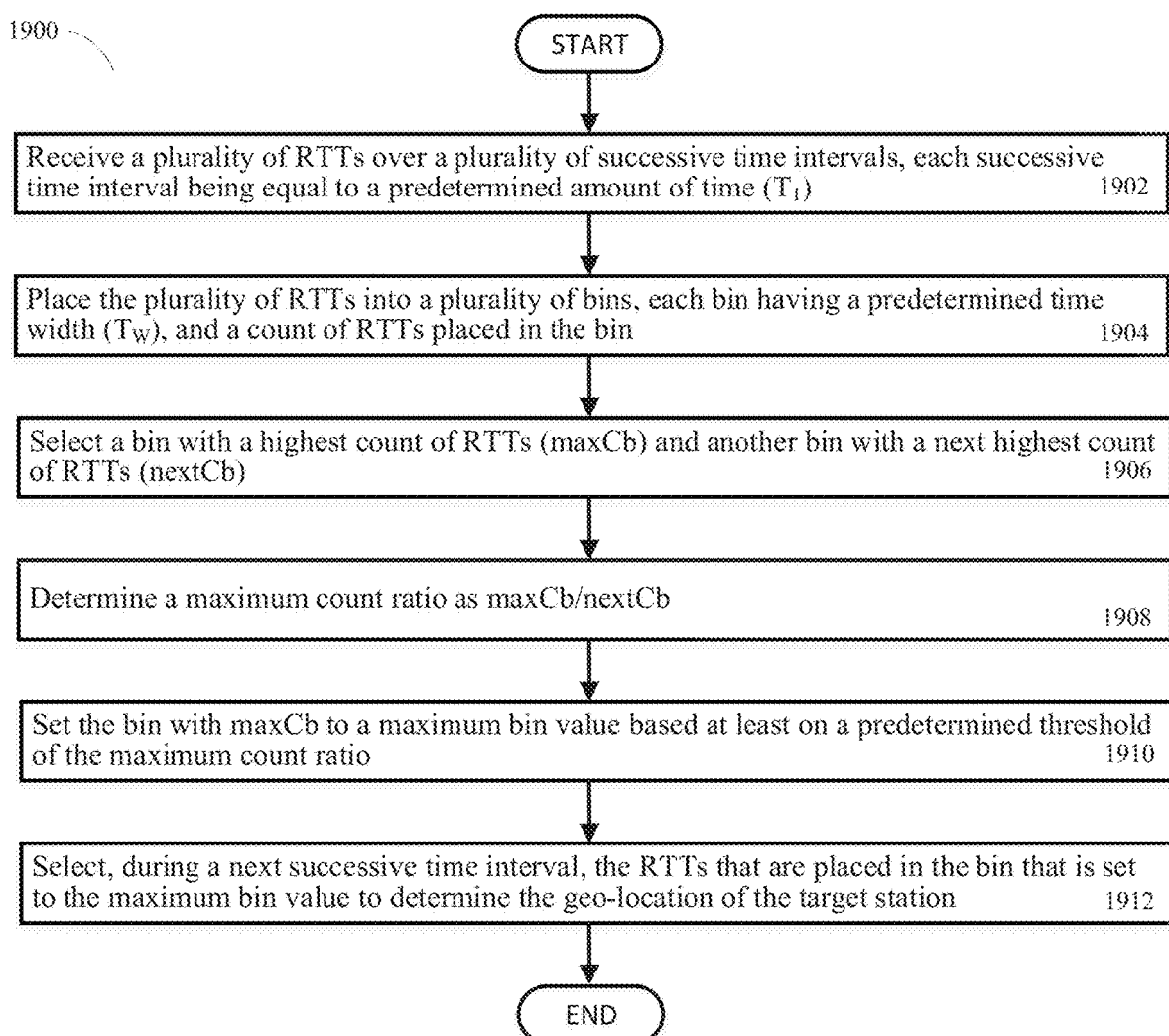

The combination of FIG. 15, FIG. 16, and FIG. 17 illustrate a flowchart of a non-limiting example of a process to reject RTTs due to noise and only pass on to a next stage of a geo-location calculation those RTTs that occur in a bin that corresponds to the RTTs from the wanted target station according to some embodiments of the present disclosure;

FIG. 18 is a flow diagram of an example process that outputs RTTs that have a high probability of representing wanted RTTs from a target station according to some embodiments of the present disclosure; and FIG. 19 is a flow diagram of another example process that determines a geo-location of a target station using RTTs of signals transmitted by a measuring station to the target station and response signals received from the target station corresponding to the transmitted signals according to some embodiments of the present disclosure.

DETAILED DESCRIPTION

Methods, devices, and systems are disclosed that mitigate the need for a correlation threshold setting and determine the presence of wanted RTT measurements in the presence of many false RTTs. This Application incorporates U.S. patent application Ser. No. 16/589,627 and Ser. No. 16/708,923 by reference in their entireties. A presence of false RTT measurements may arise when the technique of correlation is used to determine if a received response packet is an expected response packet. A dynamic binning method is disclosed that, in the general sense, places received RTT measurements into bins which are examined in order to select the bin with the most entries and then determine if this bin contains the wanted RTTs. Based on the principle that the true RTT will be a consistent value, whereas the values of false RTTs, due to noise, will vary randomly, the bin of the true RTT may be identified. The disclosed binning method is independent of background noise level and enables sensitivities better than can be achieved by those restricted by a need to set a correlation threshold.

As described above with reference to FIG. 2, based upon a set of measured RTTs and corresponding airborne measuring station 110 locations, and with knowledge of the ground elevation of the target station 120, the airborne measuring station 110 may estimate the position of the target station 120. The disclosed dynamic binning method may be used to filter the RTT measurements such that only those RTTs that are determined to be true RTTs from the target station 120 are used in the calculations to estimate the position of the target station 120.

Figure 3:
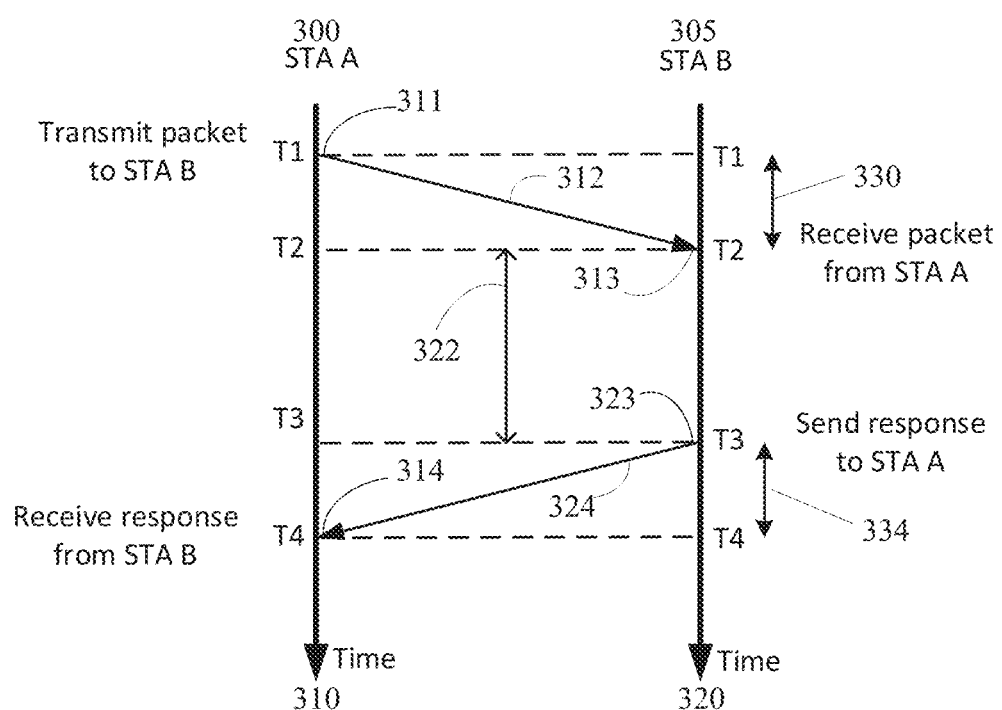
FIG. 3 is a timing diagram that describes an example ranging method that may be used to determine the distance between two wireless devices according to some embodiments of the present disclosure.

FIG. 3 is a timing diagram that describes a ranging method of the present disclosure that may be used to determine the RTT between two wireless devices, wireless device STA A 300 and wireless device STA B 305. In one embodiment, one of the wireless devices (i.e., one of STA A 300 and STA B 305) may be target station 120. In another embodiment, at least one of wireless devices (i.e., at least one of STA A 300 and STA B 305) is measuring station 110. Time axis 310 refers to the time axis for STA A 300 and time axis 320 refers to the time axis for STA B 305. At time T1 311, STA A 300 transmits a packet to STA B 305. This ranging packet 312 transmission is received at STA B 305 at time T2 313. The propagation time of the ranging packet 312 transmission is (T2−T1) 330. STA B 305 transmits a response packet 324 at time T3 323. The time 322 that has elapsed between the reception of the ranging packet 312, at time T2 313, and the transmission of the response packet 324, at time T3 323, is the turnaround time at STA B 305. Ideally the turnaround time 322 at STA B 305 will be equal in duration to SIFS. At time T4 314, STA A 300 receives the response packet 324 from STA B 305. The propagation time of the transmission of the response packet 324 is (T4−T3) 334. It should be noted that the time differences 330 (T2−T1) and 334 (T4−T3) represent the propagation time, td, of the transmissions and should be equal assuming the distance between the two stations has not changed. The total time that elapses between the transmission of ranging packet 312 and the response packet 324 at STA A 300 is $$(T2-T1)+(T3-T2)+(T4-T3)=(T4-T1)=td+\text{SIFS}+td=2*td+\text{SIFS}$$

Hence, $\text{RTT}=(T4-T1)$ and $\text{TOF}=td=(T4-T1-\text{SIFS})/2$ (2)

Expression (2) is a simplified equation that is included to provide a basic idea of an example ranging transmission method. Note that the duration of the transmitted ranging packet and the response packet is not accounted for in equation (2). Note that in practice it is common that the timestamp of a packet is set to coincide with the end of the packet at the point where the frame check is completed.

Figure 4:
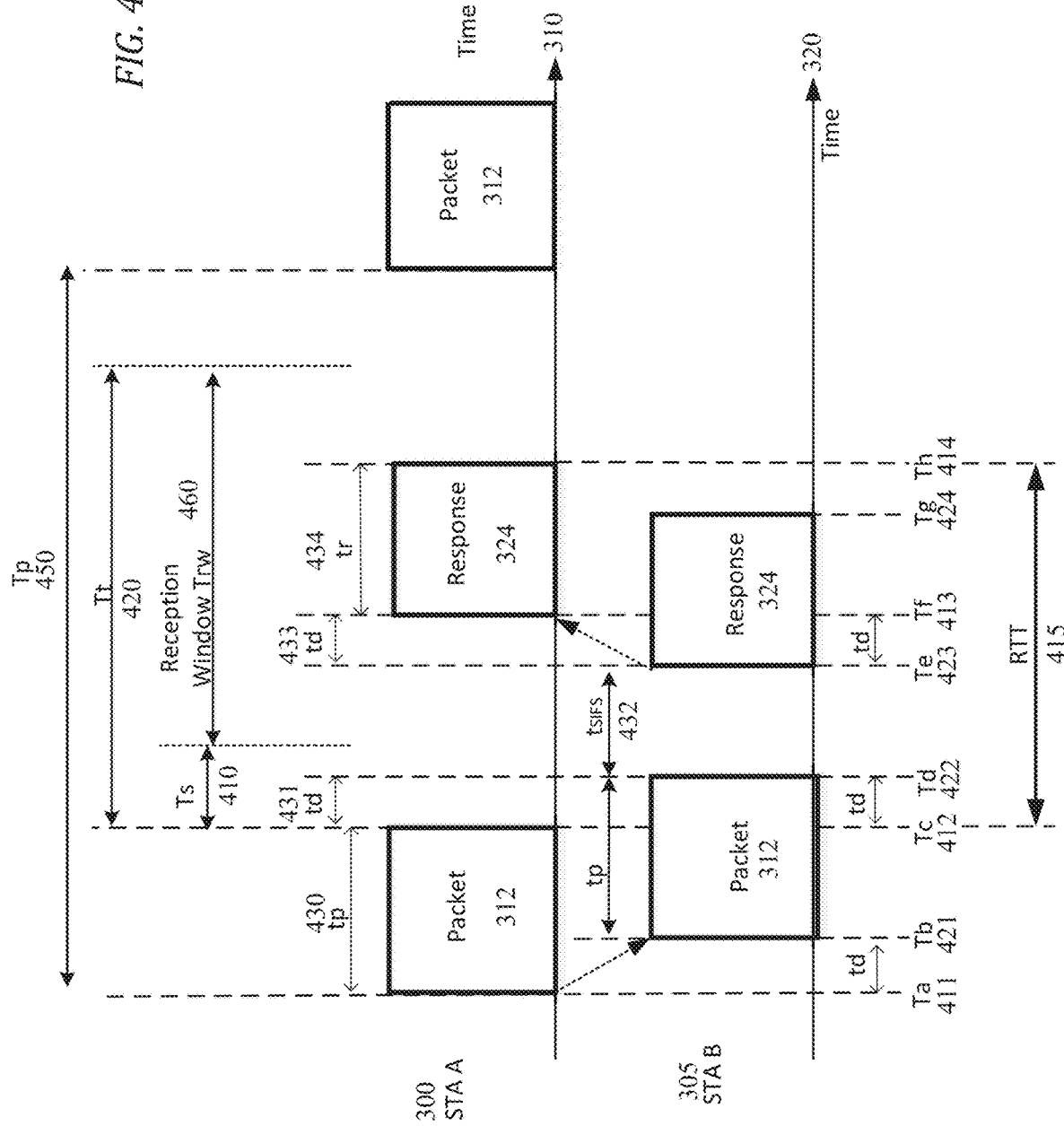
FIG. 4 is a timing diagram that describes in further detail an example ranging transmission method according to some embodiments of the present disclosure.

FIG. 4 is a timing diagram that describes in further detail the example ranging transmission method. Time axis 310 is the time axis for STA A 300 and time axis 320 is the time axis for STA B 305. At time Ta 411, STA A 300 starts the transmission of ranging packet 312 which is addressed to STA B 305. After a time-delay of td, at time Tb 421, STA B 305 starts to receive ranging packet 312. At time Tc 412, STA A 300 completes the transmission of ranging packet 312 and at time Td 422, STA B 305 completes the reception of ranging packet 312. The time difference between Tc 412 and Td 422 is td, the propagation time for the packet to travel from STA A 300 to STA B 305. Note that the time differences (Tc−Ta) and (Td−Tb) are both the duration tp 430 of the transmitted ranging packet 312.

STA B 305 transmits the response packet 324 at time Te 423. Assuming that the response packet 324 is an ACK or an CTS packet in reply to the received ranging packet 312, time Te 423 ideally will be at a time $t_{SIFS}$ 432 after time Td 422, where $t_{SIFS}$ 432 is the SIFS time as defined in the IEEE 802.11 Standard. At time Tf 413, STA A 300 starts to receive the response packet 324. The time difference between Te 423 and Tf 413 is td 433, the propagation time for the packet to travel from STA to B 305 STA A 300 and is equal to the propagation time td 431. At time Tg 424, STA B 305 completes the transmission of the response packet 324 and at time Th 414, STA A 300 completes receiving the response packet 324. RTT 415 is the time, Th, that the response packet 324 was received at STA A 300, minus the time, Tc, that the ranging packet 312 was transmitted by STA A 300. Note that the time differences (Tb−Ta), (Td−Tc), (Tf−Te) and (Th−Tg) are all equal and have the value td 431 which is the propagation time for the ranging packet and response packet to travel between the two STAs.

At STA A 300, the time of a packet at the point when the frame check has completed, may be recorded. Hence, if STA A 300 is the measuring station, the time for the transmission of ranging packet 312 that is recorded is Tc 412, and the time that is recorded for the reception of the response packet 324 is Th 414. In order to calculate the value of td, it is necessary to know the duration tr 434 of the response packet 324. As the details of the response packet 324 are predictable, based upon the details of the ranging packet 312, the duration tr 434 of the response packet is known. In practice therefore, STA A 300 can calculate the values of RTT 415 and td (TOF) from expression (3):

$$\text{RTT}=(Th-Tc) \text{ and } td=(\text{RTT}-tr-t_{SIFS})/2=\text{TOF} \quad (3)$$

$$\text{and hence the corresponding distance, } D=td*c \quad (4)$$

Stated another way, STA A 300 begins transmission of ranging packet 312 at a beginning transmission time Ta 411 and ends transmission of the ranging packet 312 at an ending transmission time Tc 412. STA A 300 begins receiving of the response packet 324 at a beginning reception time Tf 413 and receives the complete response packet 324 at an ending reception time Th 414, wherein RTT is measured as the time between the ending reception time Th 414 and the ending transmission time Tc 412, and TOF is RTT minus the duration of the response packet tr 434, minus $t_{SIFS}$ 432, divided by 2.

A reception window Trw 460 may be defined which may be related to the range of the target, STA B 305. The reception window starts at time Ts 410 after the end of the transmission, Tc 412 of ranging packet 312 and ends at time Tt 420 after the end of the transmission, Tc 412 of ranging packet 312. As an example, consider the case where the target STA B 305 is considered to be at a range of, for example, 2 to 6 miles from STA A 300. In this example, the reception window Trw may be set to start at time Ts 410, 15 µs after time Tc 312, and end at time Tt 420, 65 µs after time Tc 312. In this example the duration of the reception window Trw 460 is 50 µs.

In the general sense, ranging packets may be sent at either regular intervals or in bursts. The time Tp 450 is the time between successive ranging packets either within a burst or continuous.

Figure 5:
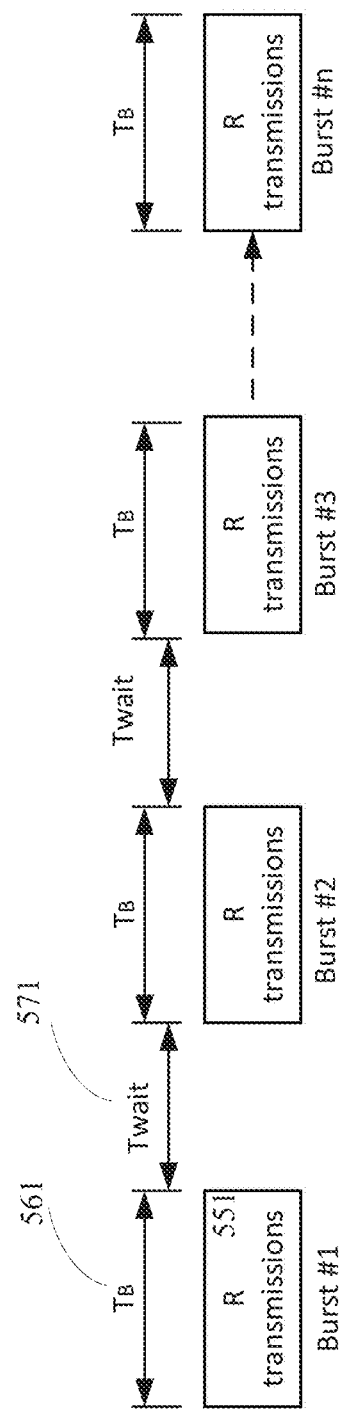
FIG. 5 is a timing diagram of an example series of bursts of transmissions of the ranging packets according to some embodiments of the present disclosure.

FIG. 5 is a timing diagram of a series of bursts of transmissions of the ranging packets 312. In one embodiment of this disclosure, a "burst", 551, consisting of a preset number R of transmissions of ranging packets 312, from STA A 300, may be sent followed by a "wait" period, Twait 571. This sequence may continue until a command may be issued to terminate the transmissions. Within each burst, each of the R transmissions may be separated by a preset time, Tp 430. The duration $T_B$ of each burst will therefore be R*Tp. For example, a burst may consist of 30 transmissions of ranging packets 312 from STA A 300, each transmission, say, 1 ms apart, followed by a wait period of, say, 30 ms after which another burst of 30 transmissions may be sent. In this example the duration of each burst will be 30 ms and about 500 ranging packets 312 will be transmitted per second.

As mentioned previously, the packet exchange may be any pair of packets where an automatic response packet is sent. Commonly used packets in Wi-Fi include an RTS/CTS exchange and a Data (null)/Ack exchange.

In some embodiments, the disclosed method applies to the reception of direct sequence spread spectrum DSSS ACK and CTS packets in response to data null and RTS packets respectively, in the 2.4 GHz band. In other embodiments, the disclosed method applies to the reception of OFDM ACK and CTS packets in response to data null and RTS packets respectively, in the 2.4 GHz and 5 GHz bands. A more complete understanding of the present disclosure, and the attendant advantages and features thereof, will be more readily understood by reference to the following detailed analysis of the reception of direct sequence spread spectrum DSSS ACK and CTS packets using correlation.

In one non-limiting embodiment used to describe some of the functions and concepts herein, a DSSS CTS and a DSSS ACK packet consist of 304 bits.

A 1 Mbps DSSS packet uses an 11 bit Barker code to spread the signal. Each bit is represented by the 11 bit code either as is, for a 1, or inverted for a 0. Hence there is a theoretical processing gain (PG) of approximately 10 dB (PG=10 log 11). The modulation is binary phase shift keying (BPSK).

The probability of a bit error, Pb, for BPSK, is $$Pb = 0.5 \, erfc \sqrt{E_b/N_0} \quad (5)$$

where "erfc" is the Gauss complimentary error function
$E_b$ is energy per bit
$N_0$ is noise per hertz
For BPSK, $E_b/N_0$ is equal to the signal to noise ratio, SNR.

The packet error rate (PER) is related to the bit error, Pb by the expression $$PER = 1 - (1-Pb)^M, \quad (6)$$

where M is the number of bits in the packet
For a packet error rate PER=0.7, with M=304, from equations (5) and (6), Pb=0.00386 and Eb/No=SNR=5.5 dB.

With the 10 dB processing gain (11 bit Barker code), this is equivalent to an input SNR=−4.5 dB. The received signal level is calculated using the standard formula:

$$Pr = 10 \log(1000 \, K \, T) + 10 \log BW + NF + SNR \text{ dBm} \quad (7)$$

Where K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for DSSS and assuming NF=3 dB and SNR=−4.5 dB, from (7) Pr=−102.5 dBm.

A receiver sensitivity of −102.5 dBm for a 70% PER represents a situation with no implementation losses.

If all the bits of the CTS or ACK are known in advance, then the received bits may be compared to the expected bits. If enough of the bits match then a decision may be made that the CTS or ACK had indeed been detected. This technique is known as correlation where the decision may be based upon a correlation threshold.

In the general sense, correlation works by passing the known pattern across the noisy pattern, and if the bits agree, they add, if not, the bits subtract.

For a packet of M bits, M.Pb bits will not match and M (1−Pb) will match,

Hence Correlation %=100(Match−Mismatch)/Total $$\text{or Correlation } \% = 100(M-2 \, M \, Pb)/M = 100(1-2Pb) \quad (8)$$

Hence, for Pb=0.2, Correlation %=100 (1−2×0.2)=60%

Note that for pure noise, Pb=0.5 and hence 152 bits will agree (match), 152 will not agree (mismatch) and correlation will be 0%.

If the raw detected 304 bits of the DSSS CTS or DSSS ACK packets are correlated across the known bits of the complete packet, then it is possible to detect a CTS or ACK packet that is well below the noise level.

For a given SNR, the bit error Pb may be calculated using equation (5) and the correlation % calculated using equation (8). The variance and standard deviation, σ, of the mismatched bits may be calculated:

$$\sigma^2 = M \, Pb(1-Pb)$$

$$\sigma = \sqrt{MPb(1-Pb)} \quad (9)$$

For M bits, the number of mismatched bits is M.Pb, with a standard deviation of σ.

Hence, mismatched bits=M.Pb±σ, and the number of matched bits is M−(M.Pb±σ).

Thus, the correlation (%) from equation (8) expressed as mean±standard deviation, is given by:

$$\text{Correlation} = (M - (M \, Pb \pm \sigma) - (M \, Pb \pm \sigma))/M \quad (10)$$

$$= 1 - 2Pb \pm 2\sigma/M$$

Comparing (10) to (8), the following associations can be made:

$$\text{Correlation mean} = (1-2Pb) \quad (11)$$

$$\text{and Correlation standard deviation} = 2\sigma/M. \quad (12)$$

Noise has a bit error rate, Pb=0.5 with a mean of zero and, from equation (9), $\sigma=\sqrt{M/4}$, and from equation (12)

$$\text{noise correlation standard deviation} = \sqrt{1/M} \qquad (13)$$

Hence, the effective "3σ correlation" for thermal noise is $$3\sqrt{1/M},$$

i.e., for M=304, thermal noise 3σ correlation=0.172 or 17.2%.

Figure 6:
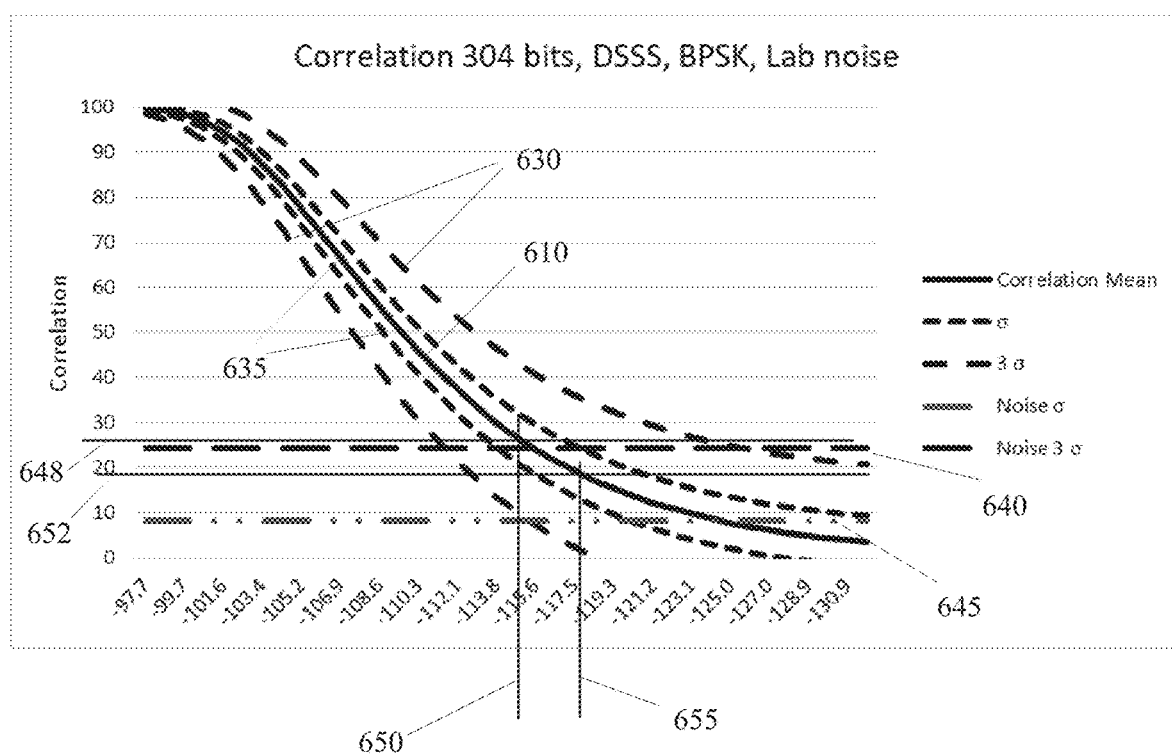
FIG. 6 is a graph of an example of Correlation % versus received signal power, Pr, for 304 bits according to some embodiments of the present disclosure.

FIG. 6 is a graph of Correlation % versus received signal power Pr for M=304 bits for laboratory, "Lab", conditions. For a given received signal strength Pr, the SNR is calculated using equation (7) assuming a noise figure of 3 dB. The SNR is used to determine the bit error rate Pb using equation (5). The correlation mean 610 is calculated using equation (11). The one σ correlations 635 and the three σ correlations 630 plots are calculated using equations (11) and (12). The 3σ and one σ values for noise, 24.3% and 8.1%, 640 and 645, respectively, are calculated using formula (13) and then multiplied by √2 to account for the 3 dB noise figure.

As discussed above with reference to FIG. 4, the correlation may be performed for the duration of a reception window Trw 460. As an example, the duration of a reception window may be 50 μs and at a typical sampling rate of 20 MS/sec there may be 1000 correlation values in the reception window of which only one would correspond to the wanted. In order to be detected, the correlation peak of the wanted signal, the response 324, must be greater than the highest peak due to noise, but there are 1000 correlations due to noise. The Gumbel distribution may be used to describe the distribution of the maximum of a sample size n, where, for example n=1000. The probability that the singular signal correlation will exceed the highest of the all of noise correlations is found by integrating, over all correlations, the Gumbel probability distribution (of highest noise correlation) times the probability that the signal exceeds that correlation, i.e. (1−CDF).

The probability, Pw, that the wanted correlation is greater than the peak noise correlation is $$P_W = \int \mathcal{G} u(x;\mu,\beta) \cdot [1 - \mathcal{F}(x)] dx \qquad (14)$$

Where $\mathcal{G}u(x; \mu, \beta)$ is the Gumbel PDF of noise with location μ, scale β for a value of n, And $[1-\mathcal{F}(x)]$ is the complement cumulative distribution function (1−CDF) of the normal distribution of the wanted signal correlation with mean and standard deviation as per equations (11) and (12).

Table 1 shows the probability of the wanted correlation peak being higher than the maximum peak of the noise correlations as the correlation mean varies for thermal, lab and suburban noise conditions. The noise is assumed to be 3 dB higher than thermal for lab conditions, and 6 dB higher for suburban conditions.

TABLE 1

Probability that the Wanted correlation is highest,

| Corr | Prob Wanted Peak Wins % | | |
|---|---|---|---|
| Mean% | Thermal | Lab | Suburban |
| 90 | 100 | 100 | 100 |
| 85 | 100 | 100 | 100 |
| 80 | 100 | 100 | 100 |
| 75 | 100 | 100 | 100 |
| 70 | 100 | 100 | 100 |
| 65 | 100 | 100 | 100 |
| 60 | 100 | 100 | 100 |
| 55 | 100 | 100 | 99 |
| 50 | 100 | 100 | 97 |
| 45 | 100 | 100 | 88 |
| 40 | 100 | 98 | 67 |
| 35 | 100 | 91 | 38 |
| 30 | 97 | 72 | 14 |
| 25 | 86 | 41 | 3 |
| 20 | 59 | 15 | 0 |
| 15 | 27 | 3 | 0 |
| 10 | 7 | 0 | 0 |
| 5 | 1 | 0 | 0 |

Referring again to FIG. 6, in a burst, 551, of N=100 transmissions, for a correlation mean of 26%, 648, from Table 1 there is about a 50% probability that the wanted peak is detected, or, a burst of 100 transmissions, the wanted peak will be detected 50 times and a noise peak will win 50 times. This corresponds to a signal level of −about 114 dBm 650. For a correlation mean of about 18% 652, from Table 1, there is a 10% probability that the wanted peak is detected, corresponding to a signal level of about −117 dBm 655. Dropping the correlation threshold from 26% to 18% increases the sensitivity by 3 dB but out of the 100 results, only 10 will be the wanted peak and 90 will be noise peaks.

FIG. 6 represents the results using equations (5) to (11) which assume laboratory noise. In many scenarios the airborne measuring station 110 will be receiving many different signals from a large area on the ground. The background noise level may be significantly higher than thermal noise and will also be variable dependent upon the environment, i.e., open, rural, suburban or urban.

Figure 7:
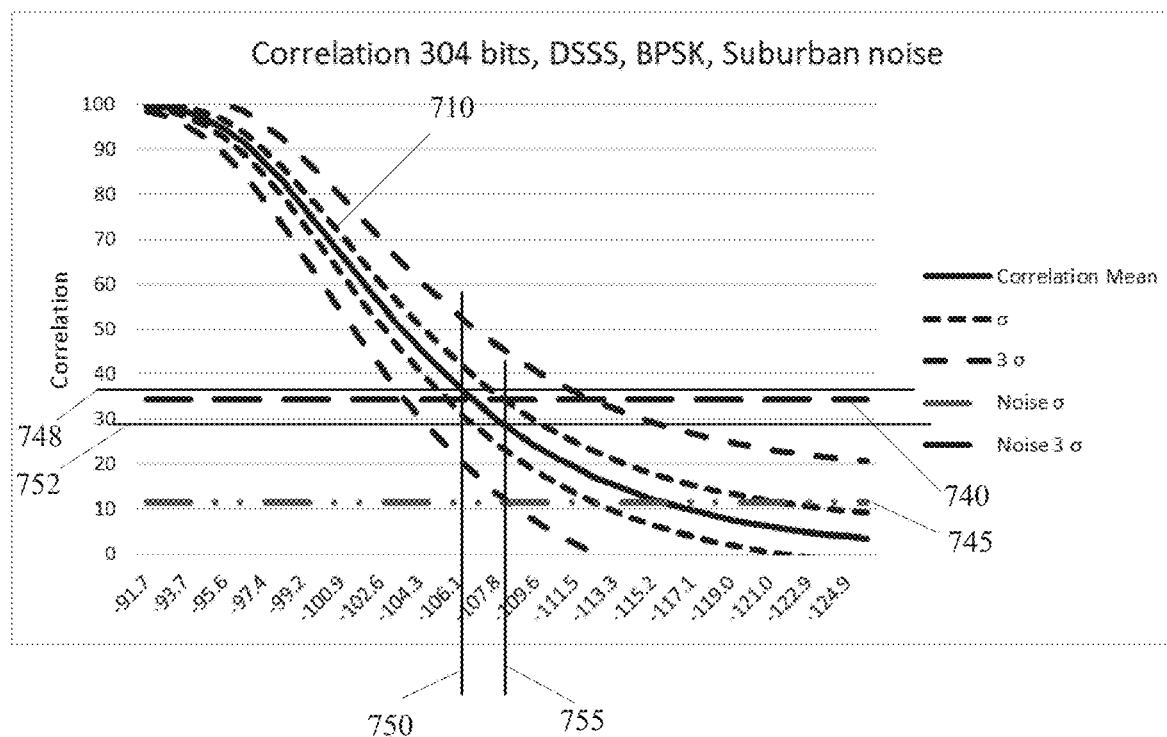
FIG. 7 is a graph of an example of Correlation % versus received signal power, Pr, for 304 bits with a noise 3σ level displayed that represents a suburban environment where a background noise is higher than thermal noise according to some embodiments of the present disclosure.

FIG. 7 is a similar graph as FIG. 6 of Correlation % versus received signal power, Pr, for 304 bits but with a noise σ 745 and 3σ level 740 displayed that represents a suburban environment where the background noise is assumed to be 6 dB higher. The correlation mean 710 curve is similar as that in FIG. 6, 610, but the signal levels, Pr, are 6 dB higher so as to maintain the required SNR. With reference to Table 1, at a correlation threshold of 37% 748 the theoretical correlation 710 corresponds to a theoretical signal level of about −106 dBm, 750, which corresponds to the level at which it is to be expected that the wanted signal will be greater than the peak noise level for 50% of the time. If the correlation threshold is lowered to about 29% 752, a wanted theoretical signal level of about −108 dBm 755 results but with the probability that a wanted peak will exceed the noise peak only 10% of the time.

As discussed above with reference to FIGS. 6 and 7, in the case of lab noise as shown in FIG. 6, a correlation threshold of about 26% may be chosen, in order to minimize the correlations due to noise. However, in the case of suburban noise, as shown in FIG. 7, a correlation threshold of about 37% may have to be chosen. Choosing a correlation threshold too low may result in the ratio of false RTT to true RTT measurements being too high resulting in the geo-location calculations failing. Choosing a correlation threshold that is too high may result in the ratio of false RTT to true RTT measurements being low but reduces the sensitivity. A more ideal setting for the correlation threshold might require a calibration procedure based upon measuring the background noise level, and as this level may change with time and place, the calibration procedure may have to be constantly updated.

FIGS. 6 and 7, as discussed above, are based upon the correlation of DSSS CTS or DSSS ACK packets. If using OFDM CTS or ACK packets, as the modulation is the same, BPSK, the performance is similar except that the received signal power, Pr, is generally lower due to the difference in gain between the DSSS Barker Code correlation and the Coding Gain of OFDM. However, as the signal level decreases and the bit error rate, Pb, increases, the gains due to the Barker code correlation or the coding gain will decrease.

A binning method is disclosed that mitigates the need for the use of a correlation threshold, does not require a calibration procedure, and enables a high signal sensitivity even in the presence of changing background noise levels.

A more complete understanding of the present disclosure, and the attendant advantages and features thereof, will be more readily understood by reference first to an exemplar analysis of a general binning method.

A number of bins, B, may be created as the RTT measurements are received. As discussed above with reference to FIG. 4, after having transmitted the ranging packet 312, STA A 300 (which may be airborne measuring station 110) may listen for a response packet 324 for a time period Trw 460. Let each bin have the same time width, $T_W$, hence the number of bins, $B=T_{rw}/T_W$. For example, for $T_{rw}=100$ μs and $T_W=10$ μs, B=10. Let the number of transmissions per second of the ranging packet 312 be N. As discussed above with reference to FIG. 5, in the example given there, there may be about 500 transmissions per second of the ranging packet 312, hence N=500. Assuming no correlation threshold is used, there will be 500 RTT measurements, as a peak correlation will be found in every reception window $T_{rw}$. Assuming that RTTs due to noise are distributed with a Poisson distribution, then, after N transmissions, the average count per bin, due to noise, will be N/B and the standard deviation, σ, is $$\sqrt{\frac{N}{B}}.$$

For example, if N=500 and B=10, the average count per bin will be 50 and σ=7.07. Counts in the bins due to noise, may be assumed to vary with a Poisson distribution and the bin with the top count, corresponding to 3σ, a probability of 0.2%, would have a value of about 72. Assuming that a percentage of the RTTs correspond to the target station 120, then these would all be added to one bin, which may be termed the "wanted" bin. For example, if 20% of the 500 RTTs, i.e., 100, corresponded to the target station 120, then 400 RTTs would be due to noise, resulting in an average count of 40 per bin and a standard deviation of 6.32, resulting in a count of 59 in the noise bin with the top count. With the average count due to noise of 40, and the number of true RTTs is 100, then the wanted bin will have a count of 140. In this example, the wanted bin will have a wanted to top noise bin count ratio of 140/59=2.37. If, in order to assess a minimum condition, it is assumed that the count due to noise in the wanted bin is equivalent to −σ, i.e., 34, then the wanted to top noise bin count ratio becomes 134/59=2.27.

Figure 8:
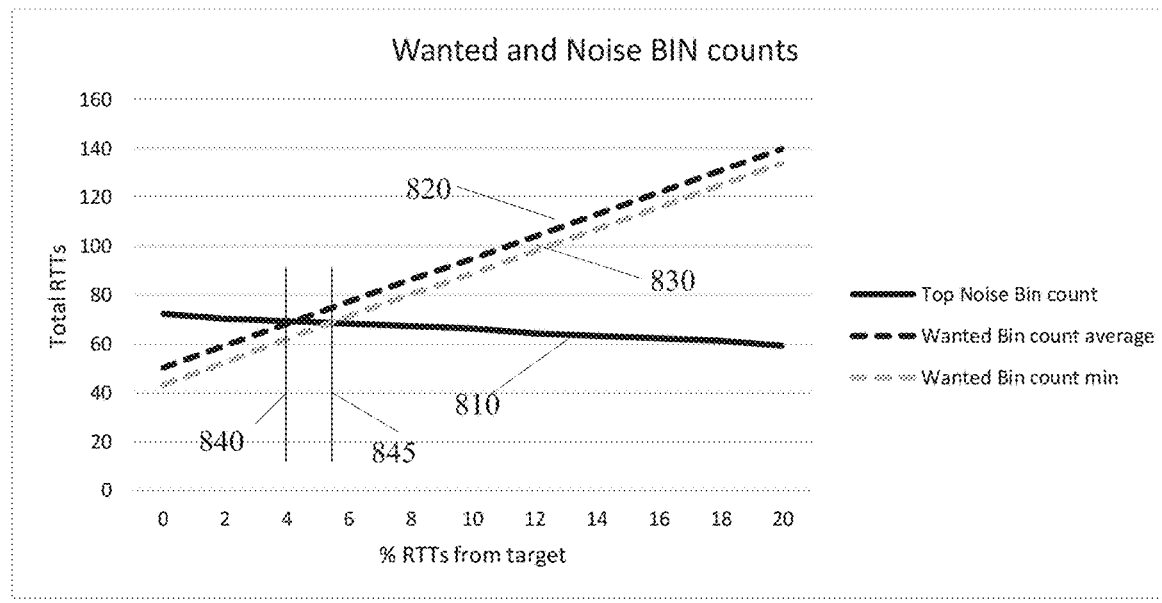
FIG. 8 is a graphical representation of an example of wanted and noise bin counts, for varying percentage of RTTs from a target station, with conditions B=10 and N=500, according to some embodiments of the present disclosure.

FIG. 8 is a graphical representation of the wanted and noise bin counts, for varying percentage of RTTs from the target station 120, with the conditions B=10 and N=500. The total number of RTTs in the top noise bin count 810 gradually decreases as the percentage of RTTs from the target station 120 increases from 0 to 20%. The average number of RTTs in the wanted bin 820 rises linearly as the percentage of RTTs from the target station 120 increases from 0 to 20%. Assuming that the noise count in the wanted bin is −σ, then the "minimum' number of RTTs in the wanted bin 830 also rises linearly as the percentage of RTTs from the target station 120 increases, but the count is lower. The average wanted bin count 820 exceeds the top noise bin count 810 at the point 840 where about 4% of the RTTs from the target station 120 are detected. The minimum wanted bin count 830 exceeds the top noise bin count 810 at the point 845 where about 5.5% of the RTTs from the target station 120 are detected. At these points 840 and 845 it would be impossible to distinguish the wanted bin from the noise bins.

Figure 9:
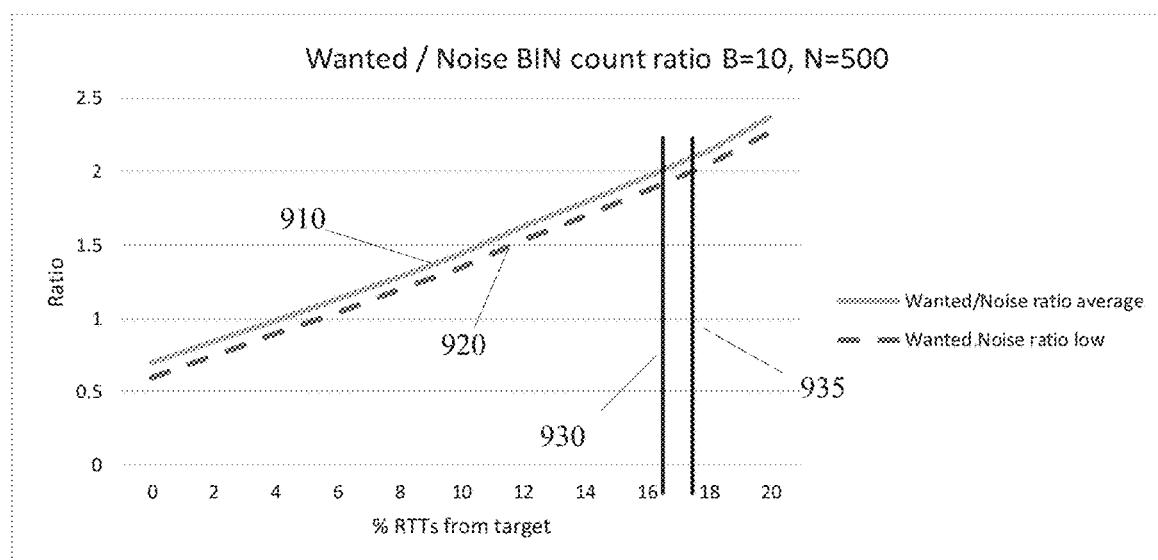
FIG. 9 is a graphical representation of an example wanted to top noise bin count ratios for varying percentage of RTTs from a target station, with the conditions B=10 and N=500, according to some embodiments of the present disclosure.

FIG. 9 is a graphical representation of the wanted to top noise bin count ratios for varying percentage of RTTs from the target station, with the conditions B=10 and N=500. The average wanted to top noise bin count ratio 910 reaches a value of two when about 16%, 930, of the RTTs from the target station 120 are detected, and the minimum wanted to top noise bin count ratio 920 reaches a value of two when about 18%, 935, of the RTTs from the target station 120 are detected. For example, when 16% of the wanted RTTs from the target station 120 are detected, out of the 500 RTTs, 420 will be noise and 80 will be wanted. Hence the average noise bin count will be 42 with a standard deviation of 6.48. The top noise bin count is therefore [42+3*6.48]=62. The count in the wanted bin is 80+42=122, hence, the wanted bin to top noise bin count, the "count ratio", is 122/62=1.97.

Stated another way, if a bin has a count equal to or greater than twice the count of any other bin, then that bin may be assumed to be the bin with the RTTs of the target station 120. Conversely, if no bin has a count equal to or greater than twice the count of any other bin, then it may be assumed that RTTs from the target station 120 are not present. Note also that the count ratio is independent of the actual signal strength of the received response packets 324 from the target station 120, and of the amplitude of the background noise. Setting the count ratio to a preset value, for example 2, effectively sets a threshold of the % RTTs from the target station 120, for example about 16%, and mitigates the requirement to set a correlation threshold. Other count ratio thresholds may be chosen, the higher the ratio the more likely that the bin with the maximum count is the one with the RTTs from the target station 120 but the effective sensitivity of the system will be less.

Figure 10:
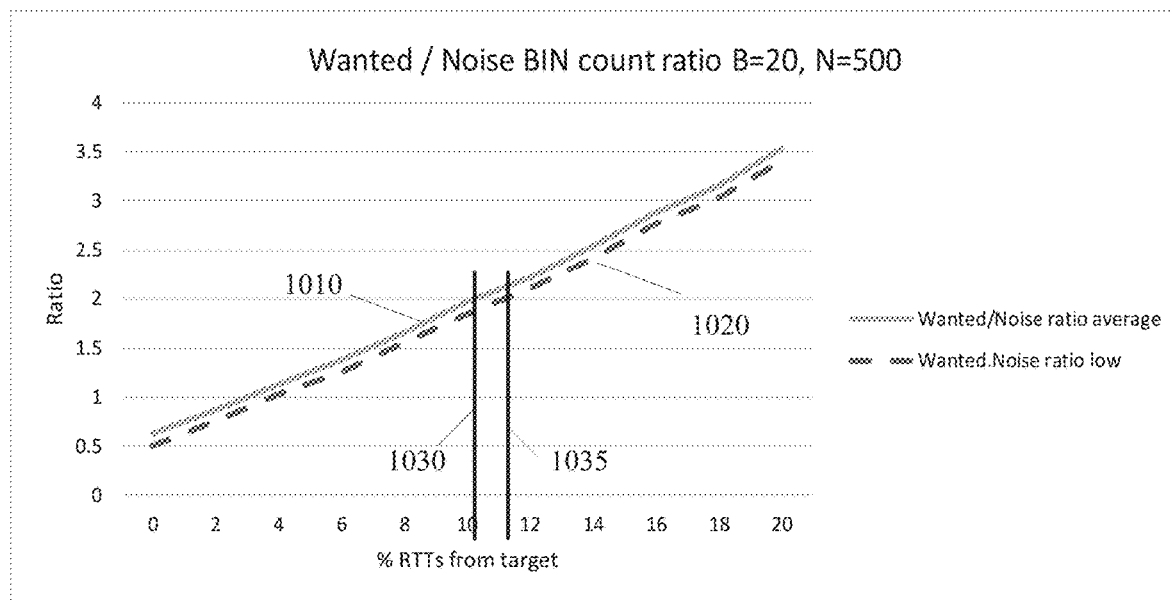
FIG. 10 is a graphical representation of an example wanted to top noise bin count ratios for varying percentage of RTTs from a target station, with the conditions B=20 and N=500, according to some embodiments of the present disclosure.

FIG. 10 is a graphical representation of the wanted to top noise bin count ratios for varying percentage of RTTs from the target station, with the conditions B=20 and N=500. By doubling the number of bins, B, the average count per bin due to noise will be halved. The average wanted to top noise bin count ratio 1010 reaches a value of two, 1030, when about 10% of the RTTs from the target station 120 are detected, as compared to 16%, 930, when 10 bins were used. The minimum wanted to top noise bin count ratio 1020 reaches a value of two, 1035, when about 11% of the RTTs from the target station 120 are detected, as compared to 18%, 935, when 10 bins were used. Hence, by increasing the number of bins, the sensitivity is increased. Doubling the number of bins, B, results in the halving of the bin width, $T_W$. In the previous example, $T_{rw}=100$ μs and $T_W=10$ μs, which resulted in the number of bins, B=10. In order to double the number of bins, the bin width $T_W$ must be halved, i.e., B=20, $T_W$=5 µs. The selection of a value for the bin width, $T_W$, is dependent upon the range of RTT values from the target station 120 over time. In order to collect all the wanted RTTs values from the target station 120 into the same bin, the value of the RTT cannot change beyond the chosen bin width $T_W$.

With reference again to FIG. 2, when the airborne measuring station 110 is at position B 202, the distance to the target station 120 at location F 230, is D5 211. When the airborne measuring station 110 is at position C 212, the distance to the target station 120 at location F 230, is D6 212. The difference between the RTTs corresponding to the distances D5 211 and D6 212 will be 2×(D5–D6). The longer the elapsed time between two points of the orbit 200, the further the airborne measuring station 110 will fly around the orbit and the higher the possible difference between the RTTs. The longer the elapsed time the more RTTs will be received but at the cost of having to use a wider bin width $T_W$. Conversely, setting the elapsed time shorter can result in more bins, but fewer RTTs.

An analysis of the change of RTT values, the RTT difference, is provided below.

Figure 11:
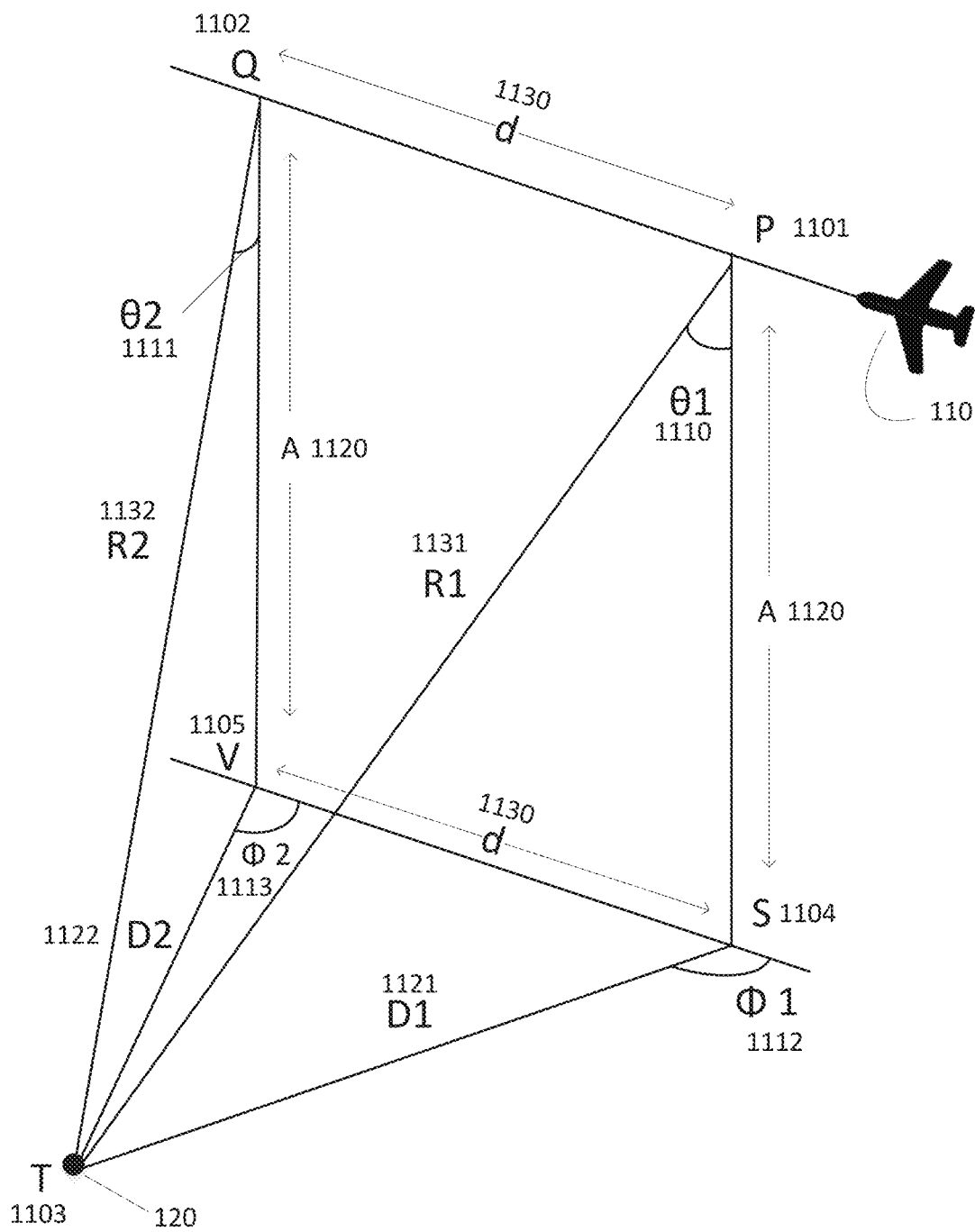
FIG. 11 is a diagram of an example airborne measuring station flying between two positions P and Q, at a distance d according to some embodiments of the present disclosure.

FIG. 11 is a diagram of an airborne measuring station 110 flying between two positions P 1101 and Q 1102, a distanced 1130. Position P 1101 is at an altitude of A 1120 above point S 1104 on the ground. Position Q 1102 is at an altitude of A 1120 above point V 1105 on the ground. The distance between points S 1104 and V 1105 is also d 1130. A target station 120 is located at position T 1103. The distance between position P 1101 and position T 1103 is R1 1131. The distance between position Q 1102 and position T 1103 is R2 1132. On the ground, the distance between point S 1104 and position T 1103 is D1 1121, and the distance between point V 1105 and position T 1103 is D2 1122. When the airborne measuring station 110 is at position P 1101, the antenna in the airborne measuring station 110 is pointing at the target station 120 at position T 1103 at an antenna tilt angle of $\phi 1$ 1110 and a yaw angle $\phi 1$ 1112. When the airborne measuring station 110 is at position Q 1102, the antenna in the airborne measuring station 110 is pointing at the target station 120 at position T 1103 at an antenna tilt angle of $\phi 2$ 1111 and a yaw angle $\phi 2$ 1113. The difference in the RTT measurements for the target station 120 when the airborne measuring station 110 moves from position P 1101 to position Q 1102 is 2×|R2–R1|. Distance d 1130 is the velocity v of the airborne measuring station 110 multiplied by the time t that it takes to fly between positions P 1101 and Q 1102, i.e., d=vt.

Knowing the distance d, the antenna tilt angle $\phi 1$, the antenna yaw angle $\phi 1$, and the altitude A of the airborne measuring station 110 the difference R1–R2 may be calculated using standard trigonometry:

From triangle $PTS$ $D1 = A \tan \theta 1$ (15)

From triangle $QTV$ $D2 = A \tan \theta 2$ (16)

From triangle $VTS$ $\dfrac{D1}{\sin \Phi 2} = \dfrac{D2}{\sin \Phi 1} = \dfrac{d}{\sin(\Phi 1 - \Phi 2)}$ (17)

From (13) and (15)

$D1 = A \tan \theta 1 = \dfrac{d \sin \Phi 2}{\sin(\Phi 1 - \Phi 2)}$   $\sin(\Phi 1 - \Phi 2) = \dfrac{d \sin \Phi 2}{A \tan \theta 1}$ Expanding $\sin(\Phi 1 - \Phi 2)$ $\sin \Phi 1 \cos \Phi 2 - \cos \Phi 1 \sin \Phi 2 = \dfrac{d \sin \Phi 2}{A \tan \theta 1}$ -continued Divide by $\sin \Phi 2$ $\dfrac{\sin \Phi 1}{\tan \Phi 2} - \cos \Phi 1 = \dfrac{d}{A \tan \theta 1}$ Rearraging $\Phi 2 = ATAN\left(\dfrac{A \sin \Phi 1 \tan \theta 1}{d + A \cos \Phi 1 \tan \theta 1}\right)$ (18)

From (16) and (17) $D2 = A \tan \theta 2 = \dfrac{d \sin \Phi 1}{\sin(\Phi 1 - \Phi 2)}$ (19)

Hence, $\theta 2 = ATAN\left(\dfrac{d \sin \Phi 1}{A \sin(\Phi 1 - \Phi 2)}\right)$ (20)

From (16) and (20) the value of D2 is now known.

Then $R1 - R2 = \sqrt{D1^2 + A^2} - \sqrt{D2^2 + A^2}$

And RTT difference=2|R1–R2| (21)

Figure 12:
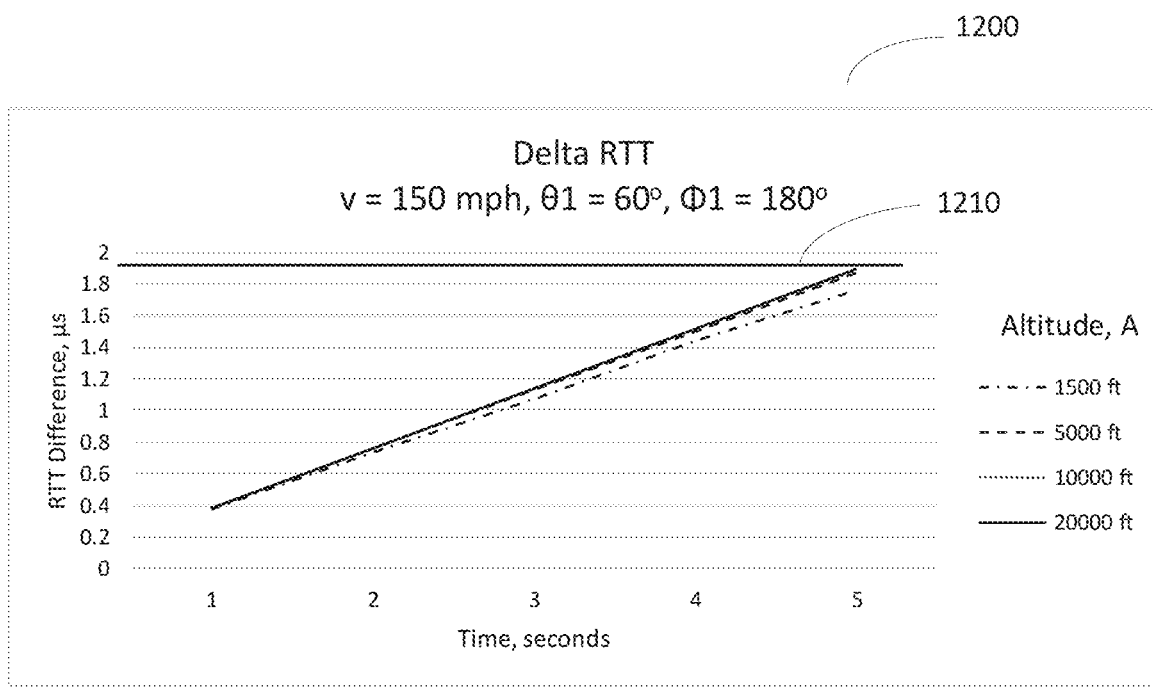
FIG. 12 is a plot of an example RTT difference, with time, for the conditions v=150 mph, θ1=60°, and φ1=180° for altitude A values of 1500, 5000, 10000 and 200000 ft according to some embodiments of the present disclosure.

FIG. 12 is a plot 1200 of the RTT difference, with time, for the conditions v=150 mph, $\theta 1$=60°, and $\theta 1$=180° for altitude A 1120 values of 1500, 5000, 10000 and 20000 ft. A velocity of 150 mph is 220 feet per second. With an antenna yaw angle $\theta 1$ of 180°, the airborne measuring station 110 is flying directly towards the target station 120 and hence this plot 1200 represents the maximum RTT difference with time. Plot 1200 indicates that altitude, A 1120, over 1500 feet, has a minimal effect on the RTT difference and also that the RTT difference is linear with time, t. If the airborne measuring station 110 is flying at a velocity of 150 mph directly towards the target station 120, with the antenna tilt angle $\theta 1$ 1110 of 60 degrees, after 5 seconds of flight, the RTTs from the target station 120 will be different by about 1.9 µs, 1210. This represents a worst case where the target station 120 is located directly on the orbit 200 of the airborne measuring station 110 and in the general sense, for practical orbits, this condition would not exist for any significant length of time.

Figure 1:
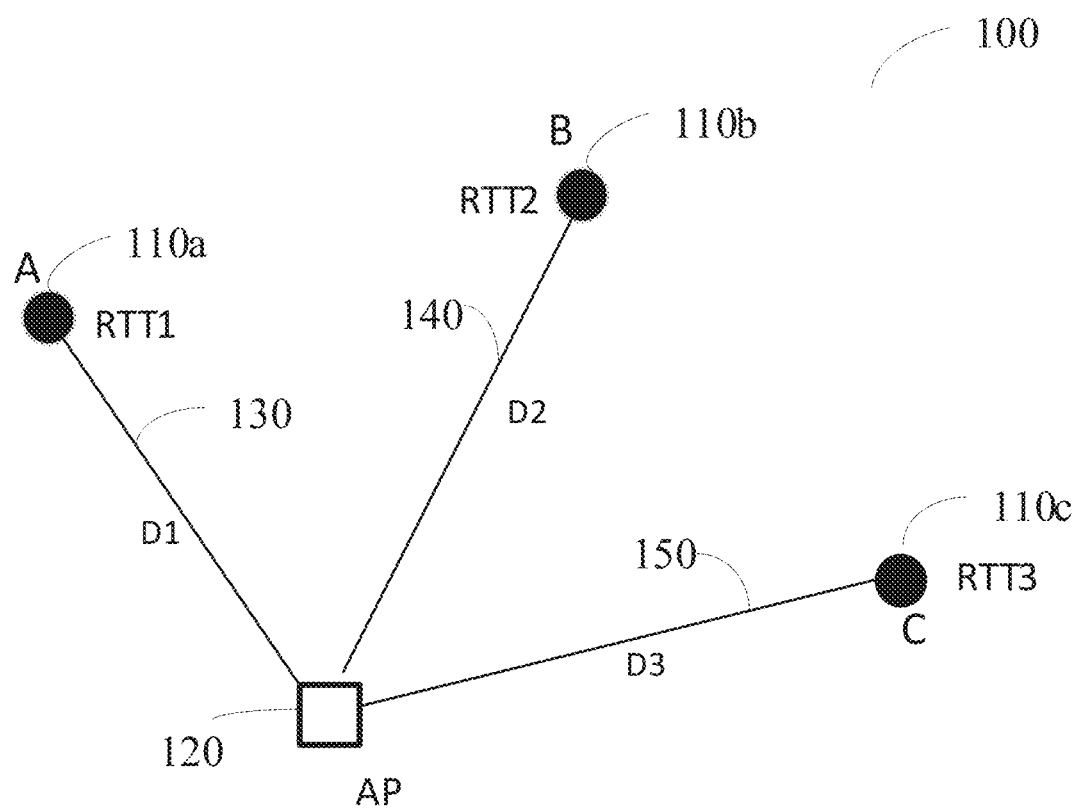
FIG. 1 is a diagram of a typical location system which includes three measuring stations.
Figure 2:
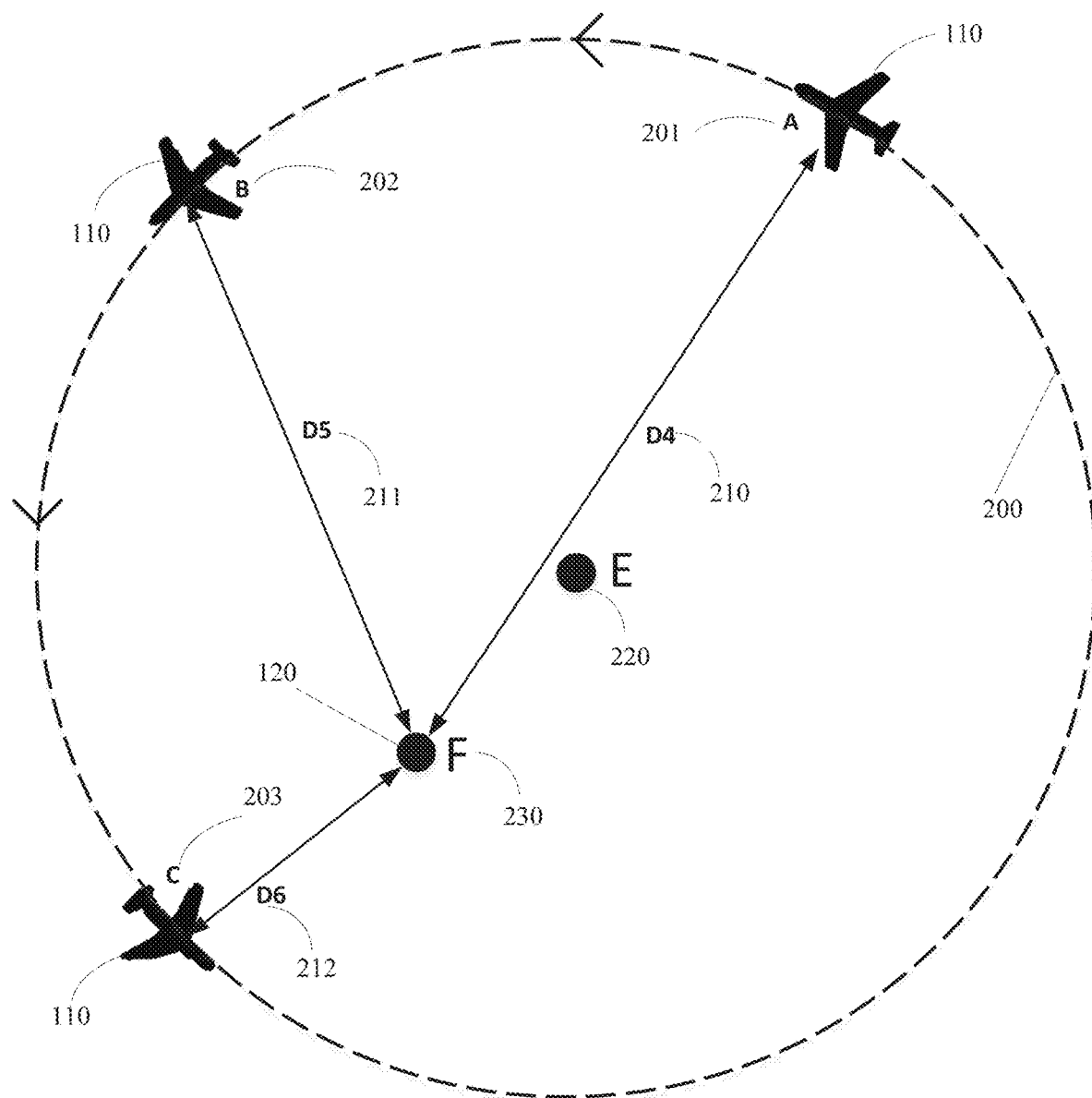
FIG. 2 is a diagram of a location system where a single airborne measuring station is used.
Figure 13:
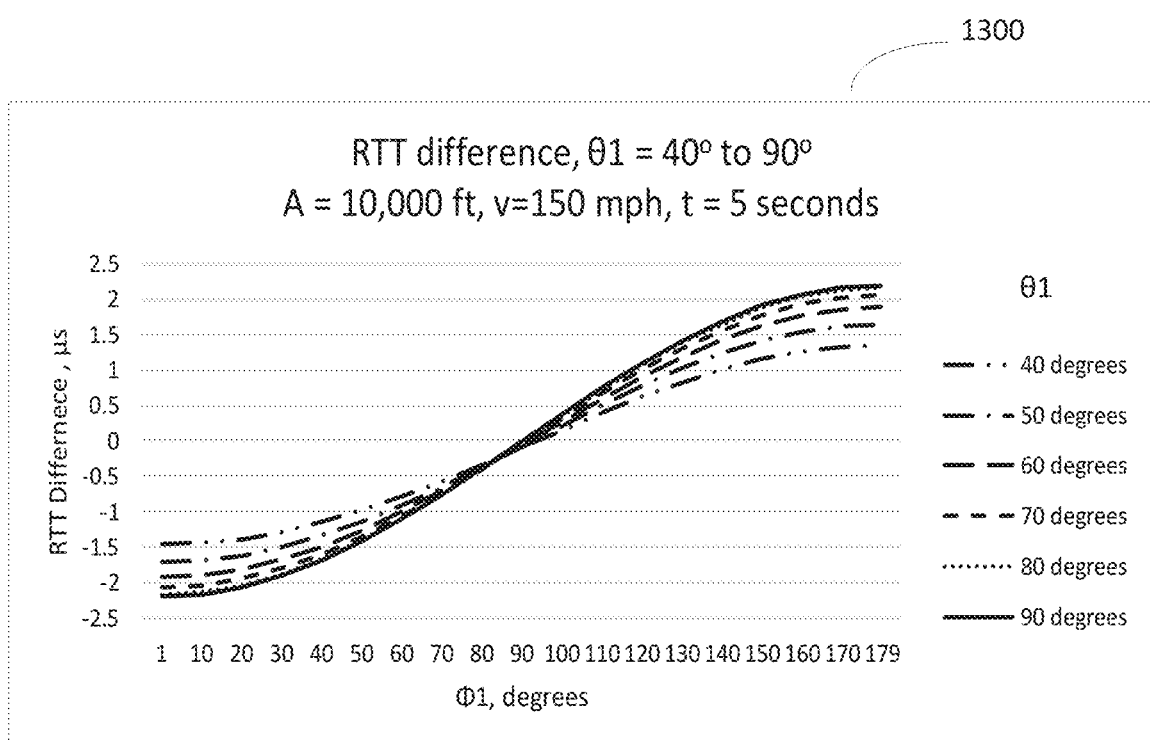
FIG. 13 is a plot of an example RTT difference against the airborne measuring station antenna yaw angle φ1, for varying antenna tilt angles, φ1, according to some embodiments of the present disclosure.

FIG. 13 is a plot 1300 of the RTT difference against the airborne measuring station 110 antenna yaw angle $\theta 1$ 1112, for varying antenna tilt angles, $\theta 1$, 1110, over an elapsed time of 5 seconds. With reference to FIG. 2, if the target station 120 is positioned at location center E 220, near the center of the orbit 200, then the yaw angle $\theta 1$ 1112 will be close to 90 degrees throughout the orbit 200. If the target station 120 is positioned at location F 230, then the yaw angle $\theta 1$ 1112 will vary from 90 degrees, corresponding to two opposite sides of the orbit 200, to a maximum and a minimum value, approximately 110° and 70°. As shown by plot 1300, as the airborne measuring station 110 moves around the orbit, and the antenna yaw angle $\theta 1$ 1112 varies from a minimum to a maximum value, passing through 90 degrees, the RTT difference will vary from a negative value, through zero, to a positive value. In the worst case, where the minimum and maximum yaw angle $\theta 1$ 1112 is 0 or 180 degrees respectively, and the antenna tilt angle $\theta 1$ 1110 is 90 degrees, the RTT difference, after 5 seconds of flight, is about +/–2.2 µs. Stated another way, as the airborne measuring station 100 flies around an orbit, 200, if the target station 120 is located directly on the orbit, then the RTT difference will vary from –2.2 µs to 0 µs to +2.2 µs if the RTTs are measured over 5 second periods. With reference again to FIG. 2, if the target station 120 is located at location F 230, then the maximum and minimum yaw angles $\theta 1$ 1112 are 110 and 70 degrees respectively. Assuming a maximum antenna tilt angle $\theta 1$ 1110 of 60 degrees, the RTT difference will vary from +1.25 µs to 0 µs to –1.25 µs to 0 µs over 5 second periods.

As discussed above with reference to FIGS. 9 and 10, the more bins, B, the lower the % RTTs from the target station 120 required for the wanted to top noise bin count ratio 1020 to be a value of two and the higher the sensitivity. The number of bins B is related to the value for the bin width, $T_W$. In order to collect all the wanted RTTs values from the target station 120 into the same bin, the value of the RTT cannot change beyond the chosen bin width $T_W$. The RTT difference depends upon two main criteria: the time period, as shown in FIG. 12, and the variation in $t_{SIFS}$ 432 of the target station 120. Wi-Fi devices in the general case use a 1 microsecond clock to time transmissions and hence the $t_{SIFS}$ 432 of a device may dither up to ±1 μs. This SIFS dither may be accounted for when setting the bin width, $T_W$. Also, in the general case where the location of the target station 120 is not at the center of the orbit 200, over time the distance to the target station 120, and thus the measured RTT for the target station 120, will vary significantly. If using fixed bins, with respect to the long term RTT difference, it is possible that over time the bin with the wanted RTT will change. In order to avoid this, there is a timeout limit where the bins need to be refreshed. With respect to the bin width $T_W$, over a short time period, the value selected may be either fixed to represent a worst case, i.e., when the antenna yaw angle θ1 1112 is 0 or 180 degrees, or indeed may be variable dependent upon the antenna yaw angle θ1 1112 as shown in FIG. 13. As discussed above with reference to FIGS. 8, 9, and 10, the higher the number of bins, B, i.e., the smaller the value for $T_W$, and the more RTT measurements, i.e., the longer the time t, the lower the percentage of wanted RTTs from the target station 120 required to produce a wanted to top noise bin count ratio of 2.

As the value of the wanted RTT measurement is unknown, using fixed bins can result in the wanted RTT measurements being spread across more than one bin. A dynamic binning method, where the bins are set up according to the RTT measurement values as they are received, and where the center value of each bin may be adjusted with time, is described below.

The basic concept of a dynamic binning method is that there are B bins, of bin width $T_W$, each containing a count Cb of RTTs.

RTTb,c represents the cth RTT in bin b,

Where, b={1, 2, 3, . . . B,}.

and where c={1,2,3 . . . Cb)}

A burst of N RTTs is received, as described above with reference to FIG. 5. As each RTT is received, RTTn, its value is compared to the average RTT value in each of the B bins.

$$\text{For bin } b, AveRTTb = \frac{1}{Cb} \sum_{k=1}^{Cb} RTT_{b,c}$$

If the value of RTTn is within $T_W/2$ of the AveRTTb for any of the B bins, then RTTn is added to that bin and the count Cb in that bin will be incremented. If the value of RTTn is not within $T_W/2$ of the AveRTTb for any of the B bins, then a new bin is created, and B is incremented. Hence, $$\forall n \in [1, N], \text{ if } \exists b \in [1, B] \text{ such that } |RTTn - AveRTTb| < \frac{T_W}{2}$$

Then $Cb = Cb + 1, RTTn = RTT_{b,C}$

Else $B = B + 1, RTTn = RTT_{B,1}$

Bursts of N RTTs continue to be received, as described above with reference to FIG. 5.

At the end of a regular time interval of $T_1$ all the existing bins may be examined to remove RTTs that were recorded at a time in the past that renders them out-of-date. An out-of-date time, $t_o$, may be based on a fixed time or one that is calculated relative to the speed of the airborne measuring station 110, or the lesser of the two. Any RTT in any bin that is older than $t_o$ may then be discarded. The AveRTT of all the B bins may then be (re)calculated, AveRTTb.

Also, at the end of a regular interval, $T_1$, following the procedure to remove out-of-date RTTs, the bins may be examined to determine the bin with highest count, maxCb, of RTTs. The ratio of the count, maxCb, to the count, nextCb, in the bin with the next highest count of RTTs may then be determined: Ratio=maxCb/nextCb If the ratio exceeds a preset value, R, then the bin with highest count, maxCb, may be referred to as "BINmax". For example, a value of 2 may be used for R. The (re)calculated RTT average values, AveRTTb, and BINmax, may then be used throughout the next $T_1$ time interval.

During the regular intervals $T_1$, several bursts of N RTTs may be received. After each burst of N RTTs, if a BINmax is present (as determined for the previous $T_1$ interval), then only those RTTs that are added to BINmax are passed on to the next stage for the calculation of the geo-location. The other RTTs are retained in their respective bins. If a BINmax is not present, then none of the N RTTs that have been received during that burst are passed on to the next stage for the calculation of the geo-location, but the N RTTs of that burst are all still retained in their respective bins. RTTs may only be deleted when they become out-of-date.

The objective of the dynamic binning process, as disclosed above, is to reject RTTs due to noise and only pass on to the next stage of the geo-location calculation those RTTs that occur in the bin that corresponds to the RTTs from the wanted target station 120. As discussed above with reference to FIGS. 8, 9, and 10, the dynamic binning count ratio R is independent of the actual signal strength of the received response packets 324 from the target station 120, and of the amplitude of the background noise. Setting the count ratio R to a preset value, for example 2, effectively sets a threshold of the % RTTs from the target station 120, as discussed above with reference to FIG. 9, and mitigates the requirement to set a correlation threshold that would need to be varied, as the background noise changes, in order to achieve maximum sensitivity.

Figure 14:
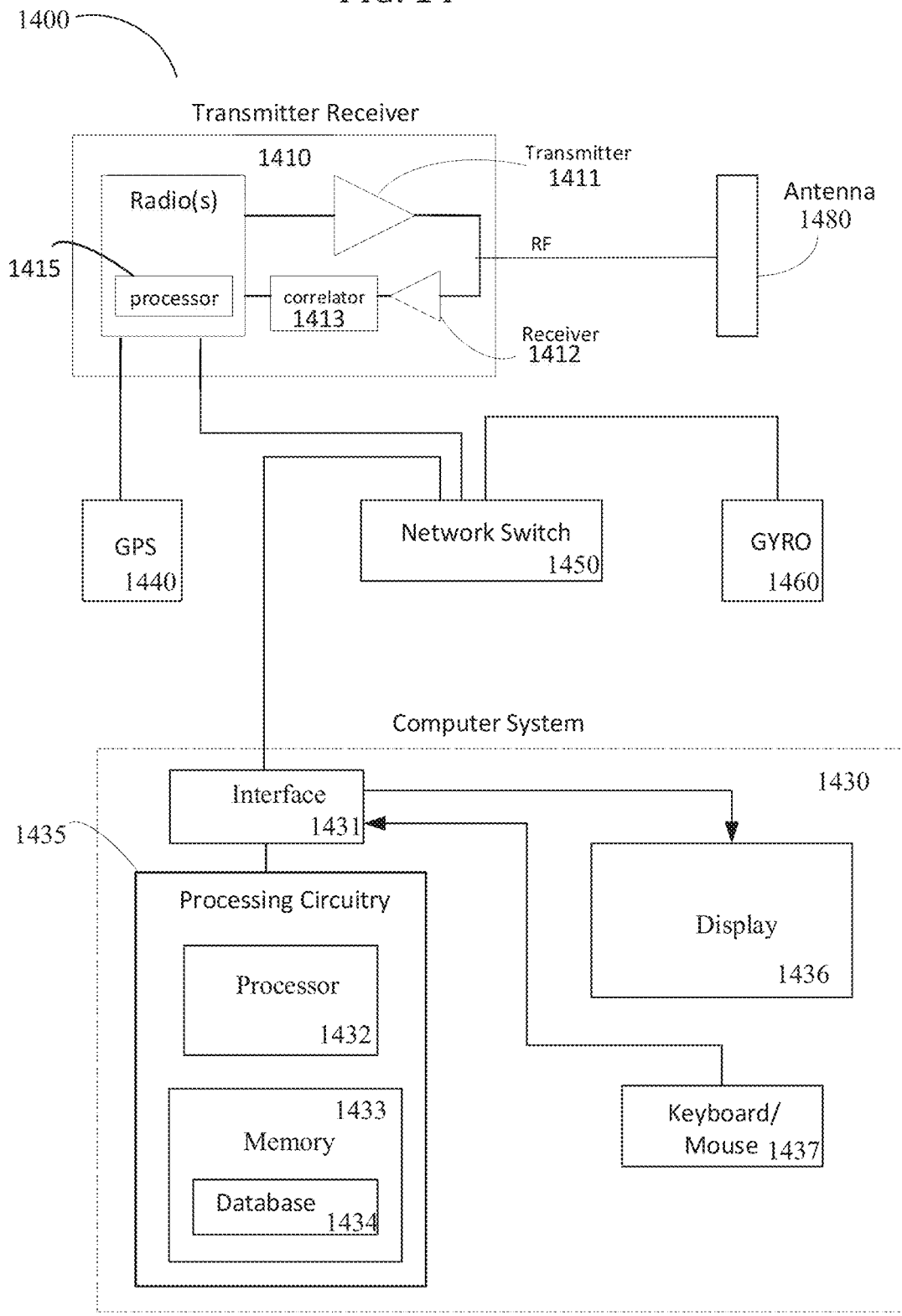
FIG. 14 illustrates a block diagram of an example wireless communication device which, according to an embodiment of the disclosure, may be used as or as part of the airborne measuring station.

FIG. 14 illustrates a block diagram of an example wireless communication device 1400 which, according to an embodiment of the disclosure, may be used as or as part of the airborne measuring station 110. In one embodiment, wireless communication device 1400 may include an antenna assembly 1480, a transmitter receiver 1410, a computer system 1430, a global positioning system (GPS) module 1440, a gyro 1460 and a network switch 1450 such as an Ethernet switch.

The transmitter receiver 1410 may transmit and/or receive radio frequency (RF) signals to and from the antenna assembly 1480. The GPS module 1440 output may be connected to the transmitter receiver 1410. The GPS module 1440 may provide the latitude, longitude, and altitude of the wireless communication device 1400. The transmitter receiver 1410 may append GPS information to any RF transmission and/or reception. The network switch 1450 may be connected to the Transmitter Receiver 1410, and the computer system 1430. The transmitter receiver 1410 may include a transmitter 1411 and a receiver 1412. The receiver 1412 may be connected to a correlator 1413 that may perform the correlation processes as described above with reference to FIGS. 6 and 7. The transmitter receiver 1410 may include a processor 1415 that may perform all or part of the exemplar binning processes as described above with reference to FIGS. 8, 9 and 10 and as further described in FIGS. 15, 16 17 and 18 below. In addition to a traditional processor, the processor 1415 may include integrated circuitry for processing and/or control, e.g., one or more processors and/or processor cores and/or FPGAs (Field Programmable Gate Array) and/or ASICs (Application Specific Integrated Circuitry) for carrying out the functions described herein with respect to the Transmitter Receiver 1410. Although not shown, the Transmitter Receiver 1410 may include memory that may work in conjunction with the processor 1415 to perform the functions described herein with respect to the Transmitter Receiver 1410. The GPS information may be provided to the processor 1415 by the GPS module 1440. RF receptions may have the GPS information added such that the position of the wireless communication device 1400 is known for each received signal. The receiver 1412 may include more than one radio and therefore any transmission from transmitter 1411 may be automatically received by another radio within the receiver 1412 and by this means, the airborne platform position is also known for each transmission and the time of the transmission is also known. The GPS information may be sent to the network switch 1450 and therefore made available to the computer system 1430. In some embodiments, the network switch 1450 is an Ethernet switch.

The computer system 1430 may include an interface 1431. Interface 1431 may contain an Ethernet connection to the network switch 1450, the connection to a display 1436, a connection to a keyboard and mouse 1437 as well as interfacing to the processing circuitry 1435. In some embodiments the processing circuitry 1435 may include a processor 1432, a memory 1433 and a database 1434. The database 1434 may contain the ground mapping information of the area of interest and the processor 1432 and memory 1433 may be used to carry out all or part of the exemplar binning processes as described above with reference to FIGS. 8, 9 and 10 and as further described in FIGS. 15, 16 17 and 18 below. The processor 1432 and memory 1433 may be used to carry out processes for the geo-location of the target station 120, using the output of the binning process derived in the processor 1415 of the transmitter receiver 1410, plus information of the position of the wireless communication device 1400 derived from the GPS module 1440, the gyro 1460, and information on the target station 120 which may be inputted using the keyboard and mouse 1437. The display 1436 may be used to show the ground map together with the estimated location of the target station 120. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 1435 may include the memory 1433 and a processor 1432, the memory 1433 containing instructions which, when executed by the processor 1432, configure the processor 1432 to perform the one or more functions described herein. In addition to a traditional processor and memory, the processing circuitry 1435 may comprise integrated circuitry for processing and/or control, e.g., one or more processors and/or processor cores and/or FPGAs (Field Programmable Gate Array) and/or ASICs (Application Specific Integrated Circuitry).

The processing circuitry 1435 may include and/or be connected to and/or be configured for accessing (e.g., writing to and/or reading from) the memory 1433, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1433 may be configured to store code executable by control circuitry and/or other data, e.g., data pertaining to communication, e.g., configuration and/or address data of nodes, etc. The processing circuitry 1435 may be configured to control any of the methods described herein and/or to cause such methods to be performed, e.g., by the processor 1432. Corresponding instructions may be stored in the memory 1433, which may be readable and/or readably connected to the processing circuitry 1435. In other words, the processing circuitry 1435 may include a controller, which may comprise a microprocessor and/or microcontroller and/or FPGA (Field-Programmable Gate Array) device and/or ASIC (Application Specific Integrated Circuit) device. It may be considered that the processing circuitry 1435 includes or may be connected or connectable to memory, which may be configured to be accessible for reading and/or writing by the controller and/or processing circuitry 1435.

FIG. 15, FIG. 16, and FIG. 17 form a flowchart of a non-limiting example of a process 1500 to reject RTTs due to noise and only pass on to the next stage of the geo-location calculation those RTTs that occur in a bin that corresponds to the RTTs from the wanted target station 120 according to an embodiment of the disclosure.

In some embodiments, process 1500 may include five sub-processes:

Sub-process 1 "Initializing"—Inputting values for $T_W$, $T_1$, $t_0$, R and N. Receiving during a preset interval of $T_1$ the first sets of RTTs, forming the initial set of bins, and determining their respective AveRTT values, (steps 1501 to 1527);

Sub-process 2—Determining the ratio of the count maxCb, in the bin with the highest count of RTTs, to the count, nextCb, in the bin with the next highest count of RTTs. If the ratio exceeds a preset value, R, the bin with highest count of RTTs is "BINmax" (steps 1710 to 1714);

Sub-process 3—Receiving RTTs, in bursts of N, checking their values against the AveRTT of all existing bins and placing them into either an existing bin or creating a new bin (steps 1601 to 1611);

Sub-process 4—If a "BINmax" exists, as determined in Process 2, then only those RTTs received in each burst of N RTTs that are added to BINmax are passed on to the next stage. If a BINmax is not present, then none of the RTTs that have been received during that burst are passed on to the next stage (Steps 1620 to 1624);

Sub-process 5—Examining all bins and removing RTTs that are out-of-date, i.e., older than $t_o$, and then re-calculating the AveRTT for each bin (steps 1701 to 1708).

The process 1500 may start at step 1501 where the values for Bin Width, $T_W$, Time intervals $T_1$ and $t_0$, ratio R, and the number of packets in a burst N, may be inputted. These values may be inputted via the Keyboard/Mouse 1437 or may reside in the memory 1433 of the processing circuitry 1435. At step 1502 a timer may be started so as to initiate the time intervals $T_1$ and $t_0$ and at step 1502, the value B, number of bins, may be set to 1. At step 1505 the first RTT, $RTT_1$, is received. Bin 1 may be created at step 1506 and $RTT_1$ is added to it. $RTT_2$ may then be received at step 1507.

An RTT may be the result of an exchange of a ranging packet 312 transmitted by Transmitter 1411 and the reception of a response packet 324, from a target station 120, received by Receiver 1412 as discussed above with reference to FIGS. 3 and 4. The bit pattern of the received response packet 324 is correlated against the expected bit pattern of the response packet 324 in the correlator 1413 and the results of that correlation, a peak corresponding to the RTT, are inputted to the processor 1415 as described above with reference to FIGS. 6 and 7. The time of the reception of the RTT may be appended to the RTT value as well as the corresponding position information of the airborne measuring station 110. The position information may be derived from the GPS module 1440 and, via the network Switch 1450, the Gyro 1460.

At step 1508 the value of $RTT_2$ may be compared to the value of $RTT_1$ to check if it is within $T_W/2$ of RTT 1, i.e. $|RTT_2-RTT_1|<T_W/2$, and if true, at step 1509 $RTT_2$ may be added to Bin 1 and a value for $AveRTT_1$ calculated. If, at step 1508, $|RTT_2-RTT_1|>T_W/2$, then at step 1511 a new bin, Bin 2, may be created and $RTT_2$ added to it. Then at step 1512, the value of B, the number of bins, is incremented to 2 and, at step 1513, AveRTT2 may be set equal to the value of $RTT_2$.

A new RTT, $RTT_n$, is received at step 1520 and at step 1521 the value of $RTT_n$ may be compared to the value of AveRTTb for each existing bin, Bin 1 to Bin B, to check if it is within $T_W/2$ of the AveRTTb, i.e. $|RTT_n-RTT_b|<T_W/2$, and, if true, at step 1522, $RTT_n$ may be added to that bin b, and a value for AveRTTb calculated, i.e., for b=1 to B, if $|RTT_n-AveRTT_b|<T_W/2$ (step 1521), then RTTn is added to Bin b (step 1522). At step 1523 a new value for AveRTTb may then be calculated, i.e., $$AveRTTb = \frac{1}{Cb}\sum_{c=1}^{Cb} RTT_{b,c}$$

where Cb is the number of RTTs in bin b. If, at step 1521, $|RTT_n-RTT_b|>T_W/2$ for all bins, then at step 1524 a new bin, Bin B+1, may be created and $RTT_n$ added to that bin. Then, at step 1525, the value of B, the number of bins, may be incremented and, at step 1526, the AveRTTB may be set equal to the value of $RTT_n$. At step 1527 a check is made of the time to determine if a time equal to or greater than $T_1$ may have elapsed. If not, then the process may return to step 1520 where a new RTTn may be received.

If at step 1527 it is determined that a time of T1 has elapsed, then the process may advance to FIG. 17 step 1710 where the counts, Cb, of RTTs in all bins are examined and the highest count, "maxCb", may be selected. In step 1711, the next highest count, "nextCb", may be selected. The ratio of maxCb to nextCb may then be checked in step 1712 and if that ratio is greater than R, a value inputted at step 1501, then at step 1713, the bin, "BINmax", with the count maxCb is selected, and the process advances to FIG. 16 step 1601. If, at step 1712, the ratio maxCb/nextCb is less than R, then at step 1714, no bin is selected as BINmax and the process advances to FIG. 16 step 1601.

At step 1601, a value n is initialized. A new RTT, RTTn, is received at step 1602 and at step 1603 the value of RTTn may be compared to the value of AveRTTb for each existing bin, Bin 1 to Bin B, to check if it is within $T_W/2$ of the AveRTTb, i.e. $|RTT_n-RTT_b|<T_W/2$, and, if true, at step 1604, $RTT_n$ may be added to that bin b, and a value for AveRTTb calculated, i.e., for b=1 to B, if $|RTT_n-AveRTT_b|<T_W/2$ (step 1603), then RTTn is added to Bin b (step 1604). At step 1605 a new value for AveRTTb may then be calculated, i.e., $$AveRTTb = \frac{1}{Cb}\sum_{c=1}^{Cb} RTT_{b,c}$$

where Cb is the number of RTTs in bin b. If, at step 1603, $|RTT_n-RTT_b|>T_W/2$ for all bins, then at step 1606 a new bin, Bin B+1, may be created and $RTT_n$ added to that bin. Then, at step 1607, the value of B, the number of bins, may be incremented and, at step 1607, the AveRTTB may be set equal to the value of $RTT_n$. At step 1610 the value of n may be checked against N, the number of RTTs in a burst. The number of RTTs in a burst is discussed above with reference to FIG. 5. A value for N may be inputted at step 1501 and. If n<N then at step 1611 the value for n is incremented and the process returns to step 1602 where a new RTTn may be received.

If at step 1610 it is determined that the burst of N RTTs has been received, then at step 1620 a check that a BINmax exists, as determined in step 1713, may be made. If a BINmax does exist then, at step 1621 all those RTTs that have been added to BINmax in the last burst of N RTTs, may be selected and these RTTs are outputted to the next stage of the geo-location calculations (step 1622). If, at step 1620, no BINmax exists, as determined in step 1714, then no RTTs from the last burst of N RTTs are outputted. At step 1623 a check is made of the time to determine if a time equal or greater than $T_1$ may have elapsed. A value for $T_1$ may be inputted at step 1501. If not, then the process may return to step 1601 where a new burst of N RTTs may be received. If, at step 1623, it is determined that a time of $T_1$ has elapsed, then at step 1624 the timer $T_1$ may be reset and then the process may advance to FIG. 17 step 1701.

At step 1701, a value b may be initiated. At step 1702, the entry times of each of the RTTs in Bin b may be examined and if that time is greater than $t_0$, then at step 1703, that RTT is deleted from Bin b. A value for $t_0$ may be inputted at step 1501. At step 1704 a check that all the entries in bin b have been examined, c=Cb, and if not, the next c maybe selected at step 1705 and the next entry may be examined at step 1702. If, at step 1704, all the entries in bin b have been examined then at step 1706 it may be determined if all bins have been examined, i.e., b=B. If not, then at step 1707 the value of b may be incremented, and the next bin is checked at step 1702. Stated another way, at the end of a preset interval of $T_1$, all bins may be examined and all RTTs that are out-of-date, i.e., older than $t_o$, may be deleted (steps 1701 to 1707). When all bins, 1 to B, have been checked and out-of-date RTTs removed, then at step 1708 the AveRTT for each bin may be re-calculated and the method advances to step 1710 where the counts, Cb, of RTTs in all bins are examined and the highest count, "maxCb", may be selected.

The process 1500 may then continue through steps 1710 to 1714, 1601 to 1623, and back to 1710, as described above. The calculations and determinations as described above with reference to FIGS. 15, 16 and 17 may be performed by the processor 1415 and/or processing circuitry 1435. The outputted RTTs at step 1622 have been selected as described above with reference to FIGS. 8, 9 and 10 and by selection of a suitable value R, as used at step 1712. Those selected RTTs have a high probability of representing wanted RTTs from the target station 120 independent of the changes in background noise levels as would be required if using a correlation threshold level, as discussed above with reference to FIGS. 6 and 7.

FIG. 18 is a flow diagram of process 1800 of an example of an embodiment of the disclosure that outputs RTTs that have a high probability of representing the wanted RTTs from target station 120. Process 1800 includes five processes 1810, 1820, 1830, 1840, and 1850 that correspond to Sub-process 1, Sub-process 2, Sub-process 3, Sub-process 4, and Sub-process 5 described above with reference to FIGS. 15, 16, and 17.

Process 1800 starts with Sub-process 1, 1810. Sub-process 1, 1810 includes and starts by step 1811 where the values for Bin Width, $T_W$, Time intervals $T_1$ and $t_0$, ratio R, and the number of packets in a burst N, are inputted. The parameter B, the number of bins, is initialized and a timer started. As discussed above with reference to FIGS. 12 and 13, a value of 5 seconds may be chosen for time interval t0, and this corresponds to a Bin Width Tw of 4 or 5 μs. Sub-process 1 1810 includes step 1812 the first RTT, $RTT_1$, is received, Bin 1 is created and $RTT_1$ is added to it such that $AveRTT_1 = RTT_1$. Process 1 1810 also includes step 1813 where an RTT, $RTT_n$, is received. The value of $RTT_n$ is compared to the value of AveRTTb for each existing bin, Bin 1 to Bin B, to check if it is within $T_W/2$ of the AveRTTb, and, if true, then $RTT_n$ is added to that bin b, and the value for AveRTTb calculated, i.e., for b=1 to B, if $|RTT_n - AveRTT_b| < T_W/2$, then RTTn is added to Bin b, and $$AveRTTb = \frac{1}{Cb}\sum_{c=1}^{Cb} RTT_{b,c}$$

where Cb is the number of RTTs in Bin b. If, $|RTT_n - RTT_b| > T_W/2$ for all bins, then the value of B, the number of bins, is incremented, a new bin, Bin B, is created, $RTT_n$ added to that bin and the $AveRTT_B$ is set equal to the value of $RTT_n$. Each RTT is the result of an exchange of a ranging packet 312 transmitted by Transmitter 1411 and the reception of a response packet 324, from a target station 120, received by Receiver 1412 as discussed above with reference to FIGS. 3 and 4. The bit pattern of the received response packet 324 is correlated against the expected bit pattern of the response packet 324 in the correlator 1413 and the results of that correlation, a peak corresponding to the RTT, are inputted to the processor 1415 as described above with reference to FIGS. 6 and 7. The time of the reception of the RTT, as determined by the correlator 1413, is appended to the RTT value as well as the corresponding position information of the airborne measuring station 110. The position information is derived from the GPS module 1440 and, via the network switch 1450, the Gyro 1460. Process 1 1810 includes step 1814 where a check of the elapsed time is made. If the elapsed time is less than $T_1$, then Process 1, 1810, returns to step 1813 the next $RTT_n$ is received. If the elapsed time is equal or greater than $T_1$, then the Process 1800 advances to Sub-process 2 1820.

Sub-process 2, 1820, includes and starts by step 1821 where the counts, Cb, of RTTs in all bins are examined and the highest count, "maxCb", and the next highest count, "nextCb" are selected. Sub-process 2 includes step 1822 where the ratio of maxCb to nextCb is calculated. If maxCb/nextCb>R then the bin with the count maxCb is selected, "BINmax". If maxCb/nextCb<R then no "BINmax" is selected. The Process 1800 then advances to Sub-process 3, 1830.

Sub-process 3 1830 includes and starts by step 1831 where a burst of N RTTs are received. As each RTTn, is received, where n=1 to N, the value of RTTn is compared to the value of AveRTTb for each existing bin, Bin 1 to Bin B, to check if it is within $T_W/2$ of the AveRTTb, and, if true, then $RTT_n$ is added to that bin b, and the value for AveRTTb calculated, i.e. for b=1 to B, if $|RTT_n - AveRTT_b| < T_W/2$, then RTTn is added to Bin b, and $$AveRTTb = \frac{1}{Cb}\sum_{c=1}^{Cb} RTT_{b,c}$$

where Cb is the number of RTTs in Bin b. If, $|RTT_n - RTT_b| > T_W/2$ for all bins, b=1 to B, then the value of B, the number of bins, is incremented, and a new bin, Bin B, is created with $RTT_n$ added to that bin and the $AveRTT_B$ set equal to the value of $RTT_n$. When all N RTTs have been received, then Process 1800 advances to Sub-process 4 1840.

Sub-process 4, 1840, includes and starts by step 1841 where it is a checked if a BINmax exists, as determined in Sub-process 2, step 1822. If a BINmax does exist then, all those RTTs that have been added to BINmax in the last burst of N RTTs, from Sub-process 3 1830 step 1831, are selected and outputted to the next stage of the geo-location calculations. If no BINmax exists, then no RTTs from the last burst of N RTTs from Sub-process 3 1830, are outputted. Sub-process 4 1840 includes step 1842 where a check is made of the time to determine if a time equal or greater than $T_1$ has elapsed. If BINmax exists, then for the time period $T_1$, all RTTs added to BINmax will be outputted to the next stage. If not, then Process 1800 returns to Sub-process 3 1830 where a new burst of N RTTs are received. If, at step 1842, it is determined that a time of $T_1$ has elapsed, then Process 1800 advances to Sub-process 5 1850. It may be noted that if BINmax exists, then for the time period $T_1$, all RTTs added to BINmax will be outputted to the next stage.

Sub-process 5 1850 includes and starts by step 1851 where the entry times of each of the RTTs in each Bin b, where b=1 to B, is examined and if the RTT is older than a time greater than $t_0$, then that RTT is deleted from Bin b. Sub-process 5 1850 includes step 1852 where the AveRTT for each bin is re-calculated. Process 1800 then advances back to Sub-process 2 1820.

Process 1800 then continues through Sub-process 2 1820, Sub-process 3 1830, Sub-process 4 1840 and Sub-process 5 1850, as described above.

The settings of the parameters Bin Width, $T_W$, Time intervals $T_1$ and $t_0$ are interrelated. As discussed above with reference to FIGS. 8, 9 and 10, it is advantageous to have as many bins as practical and hence the Bin Width $T_W$ should be as small as possible. As discussed above with reference to FIGS. 12 and 13, the longer the time interval, the greater the variation in RTT values from the target station 120 is. Over a 5 second period, the worst-case variation in RTT values from the wanted target station 120 is 2.2 μs if the airborne measuring station 110 is flying directly towards the target station 120. In most practical situations, the target station 120 would be located within the orbit of the airborne measuring station 110, and by reference to FIG. 13, the maximum variation in RTT values from the wanted target station 120 over a 5 second interval would be in the order of 1 μs. In addition, there is a variation in $t_{SIFS}$ 432 of the target station 120. This variation may be assumed to be in the order of ±1 μs. Hence, assuming that to is set to 5 seconds, a suitable value for $T_W$ is 4 μs (±2 μs). Higher values for $t_0$ may be chosen but, with reference to FIG. 2, as the airborne measuring station 110 flies from position A 201 to position B 202 to position C 203, then the larger the variation of the RTTs from the target station is due to the change in the distances D4 210, D5 211, and D6 212. Thus, with longer time intervals $t_0$, the higher the value for the Bin Width $T_W$ is such that all the RTTs from the target station 120 will be in the same bin. A wider Bin Width $T_W$ results in fewer bins. A further consideration for the choice of the time interval $t_0$ is that if, during part of the orbit 200, RTTs are not being received from the target station 120 then bins will still be being populated by noise, the count in each bin being greater with time. Then, when RTTs from the target station 120 are received, if counts in the bins are high, then more time is required for the RTTs to be received from target station 120, before the ratio R can be achieved. Table 2 below is a table of the time required, assuming 16% of the RTTs are the wanted RTTs from the target station 120, before the ratio R=2 is achieved for delays of 5, 10, 20, and 30 seconds, and for 5, 10, and 12 bins. Note that the timeout $t_0$ is set to be the same as the delay such that the maximum time that RTTs due to noise can populate bins is $t_0$.

TABLE 2

Time Required to reach R = 2 for 16% wanted RTT, after delay

| BINS DELAY, (and $t_0$), seconds | 5 | 10 | 20 |
|---|---|---|---|
| | Time to x2 ratio, seconds | | |
| 5 | 6 | 4 | 3 |
| 10 | 12 | 8 | 4 |
| 20 | 23 | 14 | 7 |
| 30 | 34 | 19 | 10 |

With $t_0$=5 seconds, the worst-case delay is 5 seconds, and 10 to 20 bins are possible, assuming a 100 μs reception window. As can be seen from Table 2, as soon as wanted RTTs arrive at a rate of 16%, the bin count ratio exceeds 2 in as little as 4 seconds. If a longer $t_0$ is selected the number of bins reduces and also the time to overcome the worst-case delay becomes longer. A value for $t_0$ of 5 seconds is a good compromise.

The value for $T_1$ should be chosen to be less than $t_0$ and may be chosen based upon the processing time and overhead. A suitable value for $T_1$ is 1 second.

The lower the value of the ratio R, the more effective sensitivity is, but the higher the chance that the BINmax is due to noise. The higher the value for ratio R, the better the chance that the BINmax is correct. As discussed above with reference to FIGS. 8, 9, and 10, a value of 2 for the ratio R is a reasonable choice.

FIG. 19 is a flow diagram of another example process 1900 that determines a geo-location of a target station using RTTs of signals transmitted by a measuring station to the target station and response signals received from the target station corresponding to the transmitted signals according to some embodiments of the present disclosure. At step 1902, a plurality of RTTs over a plurality of successive time intervals is received. Each successive time interval is equal to a predetermined amount of time (T1). At step 1904, the plurality of RTTs are placed into a plurality of bins. Each bin has a predetermined time width (TW), and a count of RTTs placed in the bin. At step 1906, a bin with a highest count of RTTs (maxCb) and another bin with a next highest count of RTTs (nextCb) are selected. At step 1908, a maximum count ratio as maxCb/nextCb is determined. The process 1900 also includes, at step 1910, setting the bin with maxCb to a maximum bin value based at least on a predetermined threshold of the maximum count ratio. The process 1900 further includes, at step 1912, selecting, during a next successive time interval, the RTTs that are placed in the bin that is set to the maximum bin value to determine the geo-location of the target station.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the choices of the variables' values ($T_W$, $T_1$, $t_0$, N, R), the averaging method used for the RTTs in each bin. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining a geo-location of a target station using a plurality of round-trip times (RTTs) of signals transmitted by a measuring station to the target station, and response signals received from the target station corresponding to the transmitted signals, the plurality of RTTs being placed into a plurality of bins, each bin having a count of RTTs placed in the bin, the method comprising:
    selecting a bin with a highest count of RTTs (maxCb) and another bin with a next highest count of RTTs (nextCb);
    determining a maximum count ratio as maxCb/nextCb;
    setting the bin with maxCb to a maximum bin value based at least on a predetermined threshold of the maximum count ratio; and
    selecting the RTTs that are placed in the bin that is set to the maximum bin value to determine the geo-location of the target station.

2. The method of claim 1, wherein each bin of the plurality of bins has a predetermined time width ($T_W$), and the method further includes:
    determining an average value of the RTTs in each bin of the plurality of bins, the average value corresponding to the bin; and
    for each RTT ($RTT_n$) of the plurality of RTTs:
        placing the $RTT_n$ into the bin that corresponds to the average value if a difference between the $RTT_n$ and the average value is one of less than and equal to half of the $T_W$ of the bin.

3. The method of claim 2, wherein each $RTT_n$ has a receipt time, the receipt time being a time at which the corresponding RTT is received at the measuring station, the method further including:
    for each RTT in each bin:
        determining a time difference between a present time and the receipt time of the RTT; and
        removing, from each bin, each RTT for which the time difference is greater than a preset time interval; and
    updating the average value of the RTTs in each bin.

4. The method of claim 3, wherein at least one of:
    the determining of the time difference and the removing of each RTT are performed after a predetermined amount of time ($T_1$) has elapsed; and
    the method further includes at least one of:
        receiving the plurality of RTTs over a plurality of successive time intervals, each successive time interval being equal to $T_1$;
        selecting the bin with maxCb and another bin with nextCb is performed after $T_1$ has elapsed.

5. The method of claim 2, wherein the method further includes:
    if the difference between the $RTT_n$ and the average value is greater than half of $T_W$ of each bin of the plurality of bins:
        creating a new bin and including the new bin in the plurality of bins; and
        adding the $RTT_n$ to the new bin.

6. The method of claim 1, wherein the method further includes:
    creating a first bin for a first RTT and including the first bin in the plurality of bins, the first RTT being an RTT that is first received by the measuring station; and
    placing the first RTT in the first bin.

7. The method of claim 1, the method further including:
    determining the geo-location of the target station based at least on the selected RTTs that are placed in the bin that is set to the maximum bin value.

8. The method of claim 1, wherein the RTTs that are placed in the bin that is set to the maximum bin value are selected during a next successive time interval associated with the plurality of RTTs.

9. The method of claim 1, wherein the measuring station is an airborne measuring station.

10. A wireless device, WD, configured to determine a geo-location of a target station using a plurality of round-trip times (RTTs) of signals transmitted by a measuring station to the target station and response signals received from the target station corresponding to the transmitted signals, the plurality of RTTs being placed into a plurality of bins, each bin having a count of RTTs placed in the bin, the WD comprising:
    processing circuitry configured to:
        select a bin with a highest count of RTTs (maxCb) and another bin with a next highest count of RTTs (nextCb);
        determine a maximum count ratio as maxCb/nextCb;
        set the bin with maxCb to a maximum bin value based at least on a predetermined threshold of the maximum count ratio; and
        select the RTTs that are placed in the bin that is set to the maximum bin value to determine the geo-location of the target station.

11. The WD of claim 10, wherein each bin of the plurality of bins has a predetermined time width ($T_W$), and the processing circuitry is further configured to:
    determine an average value of the RTTs in each bin of the plurality of bins, the average value corresponding to the bin;
    for each RTT ($RTT_n$) of the plurality of RTTs:
        place the $RTT_n$ into the bin, B, that corresponds to the average value, if a difference between the $RTT_n$ and the average value is one of less than and equal to half of the $T_W$ of the bin.

12. The WD of claim 11, wherein each $RTT_n$ has a receipt time, the receipt time being a time at which the corresponding RTT is received at the measuring station, the processing circuitry being further configured to:
for each RTT in each bin:
  determine a time difference between a present time and the receipt time of the RTT; and
  remove, from each bin, each RTT for which the time difference is greater than a preset time interval; and
update the average value of the RTTs in each bin.

13. The WD of claim 12, wherein at least one of:
the determining of the time difference and the removing of each RTT are performed after a predetermined amount of time (T1) has elapsed; and
the processing circuitry is further configured to at least one of:
  cause the WD to receive the plurality of RTTs over a plurality of successive time intervals, each successive time interval being equal to $T_1$;
  select the bin with maxCb and another bin with nextCb is performed after $T_1$ has elapsed.

14. The WD of claim 11, the processing circuitry being further configured to:
if the difference between the $RTT_n$ and the average value is greater than half of $T_W$ of each bin of the plurality of bins:
  create a new bin and including the new bin in the plurality of bins; and
  add the $RTT_n$ to the new bin.

15. The WD of claim 10, wherein the processing circuitry is further configured to:
create a first bin for a first RTT and including the first bin in the plurality of bins, the first RTT being an RTT that is first received by the measuring station; and
place the first RTT in the first bin.

16. The WD of claim 10, the processing circuitry being further configured to:
determine the geo-location of the target station based at least on the selected RTTs that are placed in the bin that is set to the maximum bin value.

17. The WD of claim 10, wherein the RTTs that are placed in the bin that is set to the maximum bin value are selected during a next successive time interval associated with the plurality of RTTs.

18. The WD of claim 10, wherein the measuring station is an airborne measuring station.

19. An airborne measuring station configured to determine a geo-location of a target station using a plurality of round trip times (RTTs) associated with the target station, the airborne measuring station comprising:
processing circuitry configured to:
  place the plurality of RTTs into a plurality of bins, each bin, B, having a predetermined time width ($T_W$) and a count of RTTs placed in the bin;
  select a bin with a highest count of RTTs (maxCb) and another bin with a next highest count of RTTs (nextCb);
  determine a maximum count ratio as maxCb/nextCb;
  set the bin with maxCb to a maximum bin value based at least on a predetermined threshold of the maximum count ratio; and
  select, during a next successive time interval, the RTTs that are placed in the bin that is set to the maximum bin value to determine the geo-location of the target station.

20. The airborne measuring station of claim 19, wherein each bin of the plurality of bins has a predetermined time width ($T_W$), and the processing circuitry is further configured to:
determine an average value of the RTTs in each bin of the plurality of bins, the average value corresponding to the bin; and
for each RTT ($RTT_n$) of the plurality of RTTs:
  place the $RTT_n$ into the bin that corresponds to the average value if a difference between the $RTT_n$ and the average value is one of less than and equal to half of the $T_W$ of the bin.

* * * * *